United States Patent
Sorsby et al.

(10) Patent No.: US 12,531,596 B2
(45) Date of Patent: Jan. 20, 2026

(54) DOPPLER-NULLING FOR DIRECTIONAL NETWORKS (SPATIAL AWARENESS)

(71) Applicant: Rockwell Collins, Inc., Cedar Rapids, IA (US)

(72) Inventors: William B. Sorsby, Cedar Rapids, IA (US); Eric J. Loren, North Liberty, IA (US); Tj T. Kwon, Marion, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 303 days.

(21) Appl. No.: 18/130,285

(22) Filed: Apr. 3, 2023

(65) Prior Publication Data

US 2023/0379008 A1     Nov. 23, 2023

Related U.S. Application Data

(63) Continuation-in-part of application No. 17/990,491, filed on Nov. 18, 2022, now Pat. No. 12,335,138,
(Continued)

(51) Int. Cl.
    *H04B 7/01*       (2006.01)
    *H04W 56/00*    (2009.01)
    *H04W 84/18*    (2009.01)

(52) U.S. Cl.
CPC .......... *H04B 7/01* (2013.01); *H04W 56/0035* (2013.01); *H04W 84/18* (2013.01)

(58) Field of Classification Search
CPC ..... H04B 7/01; H04W 56/0035; H04W 84/18
See application file for complete search history.

(56) References Cited

U.S. PATENT DOCUMENTS

| | | |
|---|---|---|
| 4,134,113 A | 1/1979 | Powell |
| 4,399,531 A | 8/1983 | Grande et al. |
| | (Continued) | |

FOREIGN PATENT DOCUMENTS

| | | |
|---|---|---|
| CN | 101330448 A | 12/2008 |
| CN | 101465793 A | 6/2009 |
| | (Continued) | |

OTHER PUBLICATIONS

Seddigh M et al: "Dominating sets and neighbor elimination-based broadcasting algorithms in wireless networks", vol. 13, No. 1, Jan. 1, 2002, pp. 14-25.
(Continued)

*Primary Examiner* — Keith Ferguson
(74) *Attorney, Agent, or Firm* — Suiter Swantz IP

(57) ABSTRACT

A system is disclosed. The system may include a receiver or transmitter node. The receiver or transmitter node may include a communications interface with a directional antenna element and a controller. The controller may include one or more processors and have information of own node velocity and own node orientation relative to a common reference frame. The receiver or transmitter node may be time synchronized to apply Doppler corrections associated with the receiver or transmitter node's own motions relative to the common reference frame. The common reference frame may be known to the receiver or transmitter node prior to the receiver node or transmitter receiving signals from a source.

11 Claims, 14 Drawing Sheets

Related U.S. Application Data which is a continuation-in-part of application No. 17/957,881, filed on Sep. 30, 2022, now Pat. No. 12,407,393, which is a continuation-in-part of application No. 17/857,920, filed on Jul. 5, 2022, now Pat. No. 12,287,418, which is a continuation-in-part of application No. PCT/US2022/024653, filed on Apr. 13, 2022, and a continuation of application No. 17/541,703, filed on Dec. 3, 2021, now Pat. No. 12,137,048, which is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778, said application No. 17/857,920 is a continuation of application No. 17/534,061, filed on Nov. 23, 2021, now Pat. No. 11,665,658, said application No. 17/957,881 is a continuation-in-part of application No. 17/846,625, filed on Jun. 22, 2022, said application No. 17/990,491 is a continuation-in-part of application No. 17/941,907, filed on Sep. 9, 2022, now Pat. No. 12,316,403, which is a continuation-in-part of application No. 17/940,898, filed on Sep. 8, 2022, now Pat. No. 12,366,625, which is a continuation-in-part of application No. 17/857,920, filed on Jul. 5, 2022, now Pat. No. 12,287,418, said application No. PCT/US2022/024653 is a continuation of application No. 17/233,107, filed on Apr. 16, 2021, now Pat. No. 11,726,162.

(60) Provisional application No. 63/344,445, filed on May 20, 2022.

(56) References Cited

U.S. PATENT DOCUMENTS

| | | |
|---|---|---|
| 4,438,439 A | 3/1984 | Shreve |
| 4,806,934 A | 2/1989 | Magoon |
| 5,706,010 A | 1/1998 | Franke |
| 5,835,482 A | 11/1998 | Allen |
| 5,898,902 A | 4/1999 | Tuzov |
| 6,072,425 A | 6/2000 | Vopat |
| 6,111,541 A | 8/2000 | Karmel |
| 6,115,394 A | 9/2000 | Balachandran et al. |
| 6,148,219 A | 11/2000 | Engelbrecht et al. |
| 6,195,403 B1 | 2/2001 | Anderson et al. |
| 6,415,154 B1 | 7/2002 | Wang et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,299,013 B2 | 11/2007 | Rotta et al. |
| 7,313,401 B2 | 12/2007 | Karmel |
| 7,417,948 B2 | 8/2008 | Sjöblom |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,636,061 B1 | 12/2009 | Thomas et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,954 B2 | 4/2012 | Larsson et al. |
| 8,218,550 B2 | 7/2012 | Axelsson et al. |
| 8,223,660 B2 | 7/2012 | Allan et al. |
| 8,341,289 B2 | 12/2012 | Hellhake et al. |
| 8,396,686 B2 | 3/2013 | Song et al. |
| 8,490,175 B2 | 7/2013 | Barton et al. |
| 8,553,560 B2 | 10/2013 | Axelsson et al. |
| 8,587,770 B1 | 11/2013 | Johnston et al. |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,913,543 B2 | 12/2014 | Zainaldin |
| 8,930,044 B1 | 1/2015 | Peeters et al. |
| 8,942,197 B2 | 1/2015 | Rudnick et al. |
| 8,964,739 B1 | 2/2015 | Wisehart |
| 9,179,475 B2 | 11/2015 | Koleszar et al. |
| 9,213,387 B2 | 12/2015 | King et al. |
| 9,246,795 B2 | 1/2016 | Madaiah et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,435,884 B2 | 9/2016 | Inoue |
| 9,516,513 B2 | 12/2016 | Saegrov et al. |
| 9,544,162 B2 | 1/2017 | Vasseur et al. |
| 9,628,285 B2 | 4/2017 | Császár |
| 9,713,061 B2 | 7/2017 | Ruiz et al. |
| 9,719,803 B2 | 8/2017 | Ratcliff et al. |
| 9,858,822 B1 | 1/2018 | Gentry |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,382,897 B1 | 8/2019 | Lanes et al. |
| 10,455,521 B2 | 10/2019 | Hudson et al. |
| 10,484,837 B2 | 11/2019 | Navalekar et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,622,713 B2 | 4/2020 | Ma |
| 10,763,937 B2 | 9/2020 | Kusano et al. |
| 10,785,672 B2 | 9/2020 | Kwan et al. |
| 10,798,053 B2 | 10/2020 | Nolan et al. |
| 10,873,429 B1 | 12/2020 | Kwon et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,082,324 B2 | 8/2021 | Ramanathan et al. |
| 11,129,078 B2 | 9/2021 | Yates et al. |
| 11,138,044 B2 | 10/2021 | Boehm et al. |
| 11,258,520 B2 | 2/2022 | Goergen et al. |
| 11,280,911 B2 | 3/2022 | Kennedy et al. |
| 11,290,942 B2 | 3/2022 | Kwon et al. |
| 11,528,675 B2 | 12/2022 | Nagaraja et al. |
| 11,611,375 B2 | 3/2023 | Newman et al. |

(56) References Cited

U.S. PATENT DOCUMENTS

| | | |
|---|---|---|
| 11,929,820 B2 | 3/2024 | Khan et al. |
| 11,977,173 B2 | 5/2024 | Loren et al. |
| 12,050,279 B2 | 7/2024 | Stevens et al. |
| 12,078,732 B1 | 9/2024 | Sirianni et al. |
| 12,111,406 B2 * | 10/2024 | Sorsby ............... G01S 13/74 |
| 2002/0018448 A1 | 2/2002 | Amis et al. |
| 2002/0082024 A1 | 6/2002 | Bajikar |
| 2002/0173269 A1 | 11/2002 | Grayson et al. |
| 2003/0151513 A1 | 8/2003 | Herrmann et al. |
| 2004/0028016 A1 | 2/2004 | Billhartz |
| 2004/0032363 A1 | 2/2004 | Schantz et al. |
| 2004/0121782 A1 | 6/2004 | Tester |
| 2004/0192334 A1 | 9/2004 | McBurney et al. |
| 2004/0213239 A1 | 10/2004 | Lin et al. |
| 2004/0246902 A1 | 12/2004 | Weinstein et al. |
| 2005/0033789 A1 | 2/2005 | Sirois |
| 2005/0047347 A1 | 3/2005 | Lee et al. |
| 2005/0141545 A1 | 6/2005 | Fein et al. |
| 2005/0192058 A1 | 9/2005 | Jung et al. |
| 2005/0219950 A1 | 10/2005 | Rowe |
| 2005/0272379 A1 | 12/2005 | Rotta et al. |
| 2006/0010170 A1 | 1/2006 | Ashley et al. |
| 2006/0056421 A1 | 3/2006 | Zaki |
| 2006/0176847 A1 | 8/2006 | Chen et al. |
| 2006/0239238 A1 | 10/2006 | Fernandez-Corbaton et al. |
| 2007/0021122 A1 | 1/2007 | Lane et al. |
| 2007/0097880 A1 | 5/2007 | Rajsic |
| 2007/0109979 A1 | 5/2007 | Fu et al. |
| 2007/0222665 A1 | 9/2007 | Koeneman |
| 2007/0223497 A1 | 9/2007 | Elson et al. |
| 2007/0299950 A1 | 12/2007 | Kulkarni |
| 2008/0068250 A1 | 3/2008 | Brandao et al. |
| 2008/0107034 A1 | 5/2008 | Jetcheva et al. |
| 2008/0117904 A1 | 5/2008 | Radha et al. |
| 2008/0158040 A1 | 7/2008 | Stayton et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2008/0310354 A1 | 12/2008 | Hansen et al. |
| 2009/0036144 A1 | 2/2009 | Wong et al. |
| 2009/0086713 A1 | 4/2009 | Luo |
| 2009/0203337 A1 | 8/2009 | Sisley et al. |
| 2009/0207694 A1 | 8/2009 | Guigne et al. |
| 2009/0232049 A1 | 9/2009 | Singh et al. |
| 2009/0233544 A1 | 9/2009 | Oyman et al. |
| 2009/0290572 A1 | 11/2009 | Gonia et al. |
| 2009/0303115 A1 | 12/2009 | Alizadeh-Shabdiz |
| 2009/0310505 A1 | 12/2009 | Tsai et al. |
| 2009/0312038 A1 | 12/2009 | Gildea |
| 2010/0074101 A1 | 3/2010 | Skalecki et al. |
| 2010/0074141 A1 | 3/2010 | Nguyen |
| 2010/0111065 A1 | 5/2010 | Noh et al. |
| 2010/0226450 A1 | 9/2010 | Tanaka |
| 2010/0246660 A1 | 9/2010 | Matsuo et al. |
| 2011/0006913 A1 | 1/2011 | Chen et al. |
| 2011/0013487 A1 | 1/2011 | Zhou et al. |
| 2011/0053494 A1 | 3/2011 | Kobayakawa |
| 2011/0122849 A1 | 5/2011 | Jain et al. |
| 2011/0169684 A1 | 7/2011 | Margolin |
| 2011/0188378 A1 | 8/2011 | Collins et al. |
| 2011/0199260 A1 | 8/2011 | Garrett et al. |
| 2011/0312279 A1 | 12/2011 | Tsai et al. |
| 2012/0092208 A1 | 4/2012 | LeMire et al. |
| 2012/0168566 A1 | 7/2012 | Lee et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0130682 A1 | 5/2013 | Awad et al. |
| 2013/0135137 A1 | 5/2013 | Mulder et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0340192 A1 | 11/2014 | Yamada et al. |
| 2015/0010153 A1 | 1/2015 | Robertson |
| 2015/0025818 A1 | 1/2015 | Das et al. |
| 2015/0071332 A1 | 3/2015 | Xu et al. |
| 2015/0094100 A1 | 4/2015 | Opshaug et al. |
| 2015/0222479 A1 | 8/2015 | Kim et al. |
| 2015/0287224 A1 | 10/2015 | Hooper et al. |
| 2015/0296335 A1 | 10/2015 | Joshi et al. |
| 2015/0326689 A1 | 11/2015 | Leppänen et al. |
| 2015/0366470 A1 | 12/2015 | Kim et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0265968 A1 | 9/2016 | Boutaud |
| 2016/0373997 A1 | 12/2016 | Petersen et al. |
| 2017/0026797 A1 | 1/2017 | Venkataraman et al. |
| 2017/0111266 A1 | 4/2017 | Ko |
| 2017/0134227 A1 | 5/2017 | Song et al. |
| 2017/0149658 A1 | 5/2017 | Rimhagen et al. |
| 2017/0168163 A1 | 6/2017 | Small |
| 2017/0259920 A1 | 9/2017 | Lai et al. |
| 2017/0366223 A1 | 12/2017 | Stofer et al. |
| 2018/0011200 A1 | 1/2018 | Ramamurthy et al. |
| 2018/0013665 A1 | 1/2018 | Ko et al. |
| 2018/0026475 A1 | 1/2018 | Gelonese et al. |
| 2018/0083730 A1 | 3/2018 | Gulati et al. |
| 2018/0091211 A1 | 3/2018 | Hessler et al. |
| 2018/0098263 A1 | 4/2018 | Luo et al. |
| 2018/0146489 A1 | 5/2018 | Jin et al. |
| 2018/0156919 A1 | 6/2018 | Bieber et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0294165 A1 | 9/2019 | Hofmann et al. |
| 2019/0317207 A1 | 10/2019 | Schroder et al. |
| 2019/0332067 A1 | 10/2019 | Zhao et al. |
| 2019/0349172 A1 | 11/2019 | Zhang |
| 2020/0011968 A1 | 1/2020 | Hammes et al. |
| 2020/0018603 A1 | 1/2020 | Deng et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0391061 A1 | 12/2020 | Enejehlm et al. |
| 2020/0396708 A1 | 12/2020 | Bharadwaj et al. |
| 2021/0080967 A1 | 3/2021 | Pettinger et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2022/0030511 A1 | 1/2022 | Wang et al. |
| 2022/0060959 A1 | 2/2022 | Atungsiri et al. |
| 2022/0085892 A1 | 3/2022 | Sorge |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0198351 A1 | 6/2022 | Beaurepaire et al. |
| 2022/0295492 A1 | 9/2022 | Shattil |
| 2023/0057666 A1 | 2/2023 | Kwon et al. |
| 2023/0081728 A1 * | 3/2023 | Kwon .................. G01S 13/583 |
| | | 455/73 |
| 2023/0179260 A1 | 6/2023 | Abdelghaffar et al. |
| 2023/0280435 A1 | 9/2023 | Schatz et al. |
| 2023/0280436 A1 | 9/2023 | Loren et al. |
| 2023/0280437 A1 | 9/2023 | Kwon et al. |
| 2023/0288518 A1 | 9/2023 | Graf et al. |
| 2023/0288519 A1 | 9/2023 | Schatz et al. |
| 2023/0288521 A1 | 9/2023 | Kwon et al. |
| 2023/0296716 A1 | 9/2023 | Dean et al. |
| 2023/0379008 A1 | 11/2023 | Sorsby et al. |

(56) References Cited

U.S. PATENT DOCUMENTS

| | | | |
|---|---|---|---|
| 2023/0393229 A1 | 12/2023 | Loren et al. | |
| 2023/0400549 A1 | 12/2023 | Duan et al. | |
| 2024/0151800 A1 | 5/2024 | Stevens et al. | |

FOREIGN PATENT DOCUMENTS

| | | | |
|---|---|---|---|
| CN | 101330448 B | 12/2010 | |
| CN | 101465793 B | 2/2011 | |
| CN | 101686179 B | 1/2013 | |
| CN | 103067286 B | 6/2016 | |
| CN | 107645417 A | 1/2018 | |
| CN | 110234147 A | 9/2019 | |
| DE | 102010010935 A1 | 9/2011 | |
| EP | 0908022 A2 | 4/1999 | |
| EP | 1912392 A2 | 4/2008 | |
| EP | 2743726 A1 | 6/2014 | |
| EP | 2466964 B1 | 12/2017 | |
| EP | 3026961 B1 | 8/2020 | |
| GB | 2542491 A | 3/2017 | |
| GB | 2568122 B | 11/2019 | |
| JP | 4290684 B2 | 7/2009 | |
| JP | 5164157 B2 | 3/2013 | |
| KR | 1020040107702 A | 12/2004 | |
| KR | 100568976 B1 | 4/2006 | |
| KR | 1020060078814 A | 7/2006 | |
| KR | 101231707 B1 | 2/2013 | |
| KR | 1020160071964 A | 6/2016 | |
| WO | 2008157609 A3 | 3/2009 | |
| WO | 2012062091 A1 | 5/2012 | |
| WO | 2012165938 A1 | 12/2012 | |
| WO | 2015114077 A1 | 8/2015 | |
| WO | 2015143604 A1 | 10/2015 | |
| WO | 2017101575 A1 | 6/2017 | |
| WO | 2018077864 A1 | 5/2018 | |
| WO | 2019045767 A1 | 3/2019 | |
| WO | 2020165627 A1 | 8/2020 | |
| WO | 2021251902 A1 | 12/2021 | |
| WO | PCTUS2224653 | 4/2022 | |

OTHER PUBLICATIONS

Turgut D. et al: "Optimizing clustering algorithm in mobile ad hoc networks using simulated annealing", vol. 3, Mar. 16, 20023, pp. 1492-1497.
U.S. Appl. No. 17/233,107, filed Apr. 16, 2022, Eric J. Loren.
U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.

* cited by examiner

700

702 — PROVIDING A TRANSMITTER NODE AND A RECEIVER NODE, WHEREIN EACH NODE OF THE TRANSMITTER NODE AND THE RECEIVER NODE ARE TIME SYNCHRONIZED, WHEREIN EACH NODE OF THE TRANSMITTER NODE AND THE RECEIVER NODE ARE IN MOTION, WHEREIN EACH NODE OF THE TRANSMITTER NODE AND THE RECEIVER NODE COMPRISES A COMMUNICATIONS INTERFACE INCLUDING AT LEAST ONE ANTENNA ELEMENT, WHEREIN EACH NODE OF THE TRANSMITTER NODE AND THE RECEIVER NODE FURTHER COMPRISES A CONTROLLER OPERATIVELY COUPLED TO THE COMMUNICATIONS INTERFACE, THE CONTROLLER INCLUDING ONE OR MORE PROCESSORS, WHEREIN THE CONTROLLER HAS INFORMATION OF OWN NODE VELOCITY AND OWN NODE ORIENTATION

704 — BASED AT LEAST ON THE TIME SYNCHRONIZATION, APPLYING, BY THE TRANSMITTER NODE, DOPPLER CORRECTIONS TO THE TRANSMITTER NODE'S OWN MOTIONS RELATIVE TO A COMMON REFERENCE FRAME

706 — BASED AT LEAST ON THE TIME SYNCHRONIZATION, APPLYING, BY THE RECEIVER NODE, DOPPLER CORRECTIONS TO THE RECEIVER NODE'S OWN MOTIONS RELATIVE TO THE COMMON REFERENCE FRAME, WHEREIN THE COMMON REFERENCE FRAME IS KNOWN TO THE TRANSMITTER NODE AND THE RECEIVER NODE PRIOR TO THE TRANSMITTER NODE TRANSMITTING SIGNALS TO THE RECEIVER NODE AND PRIOR TO THE RECEIVER NODE RECEIVING THE SIGNALS FROM THE TRANSMITTER NODE

FIG.7

DOPPLER-NULLING FOR DIRECTIONAL NETWORKS (SPATIAL AWARENESS)

CROSS-REFERENCE TO RELATED APPLICATIONS

The present application is related to and claims priority from the following U.S. Patent Applications:
(a) U.S. patent application Ser. No. 17/233,107, filed Apr. 16, 2021, which is incorporated by reference in its entirety;
(b) P.C.T. Patent Application No. PCT/US22/24653, filed Apr. 13, 2022, which claims priority to U.S. patent application Ser. No. 17/233,107, filed Apr. 16, 2021, all of which are incorporated by reference in its entirety;
(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;
(d) U.S. patent application Ser. No. 17/541,703, filed Dec. 3, 2021, which is incorporated by reference in its entirety, which claims priority to:
U.S. patent application Ser. No. 17/408,156, filed Aug. 20, 2021, which is incorporated by reference in its entirety; and
U.S. patent application Ser. No. 17/233,107, filed Apr. 16, 2021, all of which is incorporated by reference in its entirety;
(e) U.S. patent application Ser. No. 17/534,061, filed Nov. 23, 2021, which is incorporated by reference in its entirety;
(f) U.S. Patent Application No. 63/344,445, filed May 20, 2022, which is incorporated by reference in its entirety;
(g) U.S. patent application Ser. No. 17/857,920, filed Jul. 5, 2022, which is incorporated by reference in its entirety;
(h) U.S. Patent Application No. 63/400,138, filed Aug. 23, 2022, which is incorporated by reference in its entirety;
(i) U.S. patent application Ser. No. 17/940,898, filed Sep. 8, 2022, which is incorporated by reference in its entirety;
(j) U.S. patent application Ser. No. 17/941,907, filed Sep. 9, 2022, which is incorporated by reference in its entirety;
(k) U.S. patent application Ser. No. 17/957,881, filed Sep. 30, 2022, which is incorporated by reference in its entirety; and
(l) U.S. patent application Ser. No. 17/990,491, filed Nov. 18, 2022, which is incorporated by reference in its entirety.

BACKGROUND

Mobile Ad-hoc NETworks (MANET; e.g., "mesh networks") are known in the art as quickly deployable, self-configuring wireless networks with no pre-defined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

MANETs face many challenges due to the limited network awareness inherent in such highly dynamic, low-infrastructure communication systems. Given the broad ranges in variable spaces, the challenges lie in making good decisions based on such limited information. For example, in static networks with fixed topologies, protocols can propagate information throughout the network to determine the network structure, but in dynamic topologies this information quickly becomes stale and must be periodically refreshed. It has been suggested that directional systems are the future of MANETs, but the potential of this future has not as yet been fully realized. In addition to topology factors, fast-moving platforms (e.g., communications nodes moving relative to each other) experience a frequency Doppler shift (e.g., offset) due to the relative radial velocity between each set of nodes. This Doppler frequency shift often limits receive sensitivity levels which can be achieved by a node within a mobile network.

Directional radio-frequency (RF) networks often spend considerable amounts of time scanning the physical space over which potential RF network signals may exist. Because this scanning may be a lengthy process based on how precise the scan is, often it becomes necessary to sacrifice other potentially important system performance metrics (e.g., size of scanned area, quantity/density and beam width of signals, sensitivity, range, and/or the like) to ensure timely discovery performance.

SUMMARY

A system is disclosed in accordance with one or more illustrative embodiments of the present disclosure. In one illustrative embodiment, the system may include a receiver or transmitter node. In another illustrative embodiment, the receiver or transmitter node may include a communications interface with a directional antenna element and a controller. In another illustrative embodiment, the controller may include one or more processors and have information of own node velocity and own node orientation relative to a common reference frame. In another illustrative embodiment, the receiver or transmitter node may be time synchronized to apply Doppler corrections associated with the receiver or transmitter node's own motions relative to the common reference frame. In another illustrative embodiment, the common reference frame may be known to the receiver or transmitter node prior to the receiver node or transmitter receiving signals from a source.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 7 is a flow diagram illustrating a method according to example embodiments of this disclosure.

DETAILED DESCRIPTION

Figure 1:
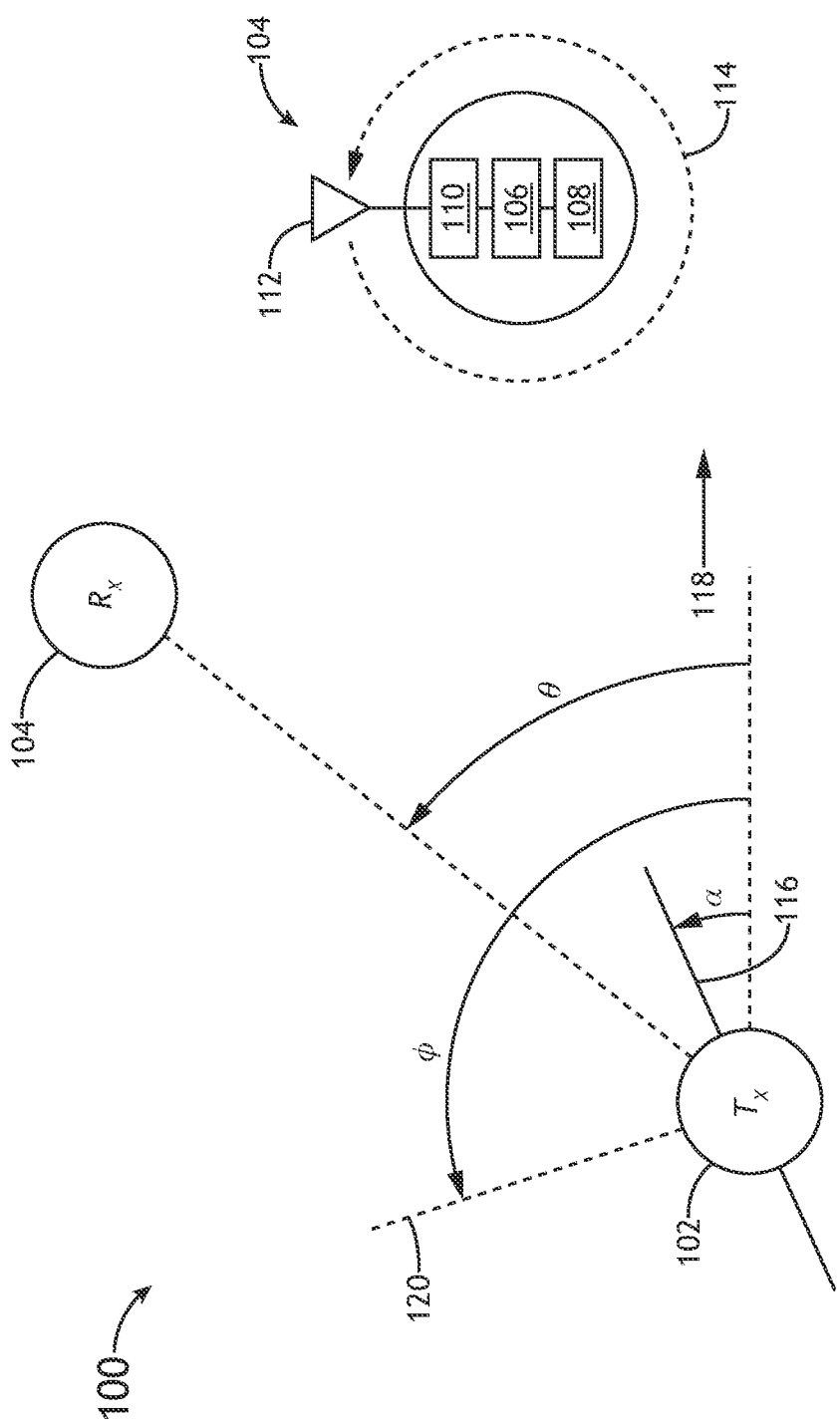
FIG. 1 is a diagrammatic illustration of two nodes in a simplified mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for achieving situational awareness using doppler nulling with directional antenna elements (e.g., electronically scanned antennas (ESAs)). For example, at least one node (e.g., which may transmit signals and/or receive signals) may utilize a directional (rather than omnidirectional) antenna element for improved performance. Embodiments may utilize time synchronized scanning sequences (along with directionality) to improve metrics such as signal-to-noise ratio, signal acquisition time, speed of attaining situational awareness of attributes of surrounding nodes, range, and the like. In some embodiments, synced scanning sequences are used so that all transmitting angles of multiple systems are pointing in the same direction at any point in time during a synced sequence, as well as all the receiving angles, which are pointed in the opposite direction. In this regard, if a pulse happens to be sent towards a particular system, that particular system's receiving angle will be aimed in the opposite direction the pulse was sent from, such that the receiving angle is configured to receive the pulse. Such a configuration may vastly improve the ability to detect a relatively large quantity of nodes in a relatively short period of time over relatively large ranges, over relatively large amounts of noise/interference, and the like. In some embodiments, a zero value or near zero value (e.g., or the like such as a zero crossing) of a calculated net frequency shift of a received signal is used to determine a bearing angle between the source (e.g., Tx node) and the receiving node using a time-of-arrival of the received signal. The bearing angle may be made more accurate by combining (e.g., averaging) it with another bearing angle estimation determined from an angle of peak amplitude gain of the signal.

Some other communication protocols (e.g., typical communication methods) may require a higher signal to noise ratio (SNR) or scanning times than directional doppler nulling methods. For example, directional doppler nulling methods may allow for using relatively less power (e.g., watts) and a weaker signal, while still providing for situational awareness, than other methods.

It is noted that U.S. patent application Ser. No. 17/857,920, filed Jul. 5, 2022, is at least partially reproduced by at least some (or all) of the illustrations of FIGS. 1-7 and at least some (or all) of the corresponding language for FIGS. 1-7 below. For example, at least some examples of doppler nulling methods and systems may be better understood, in a nonlimiting manner, by reference to FIGS. 1-7. Such embodiments and examples are provided for illustrative purposes and are not to be construed as necessarily limiting. For instance, in embodiments the transmitter node may be stationary rather than moving and/or vice versa.

Moreover, and stated for purposes of navigating the disclosure only (and which may save time when comparing differences between applications) and not to be construed as limiting, descriptions that may more directly relate to language not necessarily simply reproduced from U.S. patent application Ser. No. 17/857,920 include the discussion and figures after FIGS. 1-7.

Referring now to FIGS. 1-7, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network, itself.

Referring to FIG. 1, a multi-node communications network 100 is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360 degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116, at a relative velocity $V_{Tx}$ and a relative angular direction (an angle α relative to an arbitrary direction 118 (e.g., due east); θ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle ϕ relative to the arbitrary direction 118). The transmitting waveform (e.g., the communications interface 110 of the Tx node 102) may be informed by the platform (e.g., the controller 106) of its velocity vector and orientation (e.g., a, $V_T$) and may adjust its transmitting frequency to remove the Doppler frequency shift at each Doppler nulling direction 120 and angle ϕ.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned 8 from east relative to the transmitter, the transmitter node 102 is moving with a speed $|\vec{V_T}|$ and direction a from east and a snapshot of the scanning ϕ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c}\cos(\theta - \alpha),$$

where c is the speed of light

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction (α). That transmitter frequency adjustment ($\Delta f_T$) is proportional to the velocity projection onto the 'Null' direction (ϕ) and is:

$$\frac{\Delta f_T}{f} = -\frac{|\vec{V_T}|}{c}\cos(\varphi - \alpha)$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)]$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

Figure 2A:
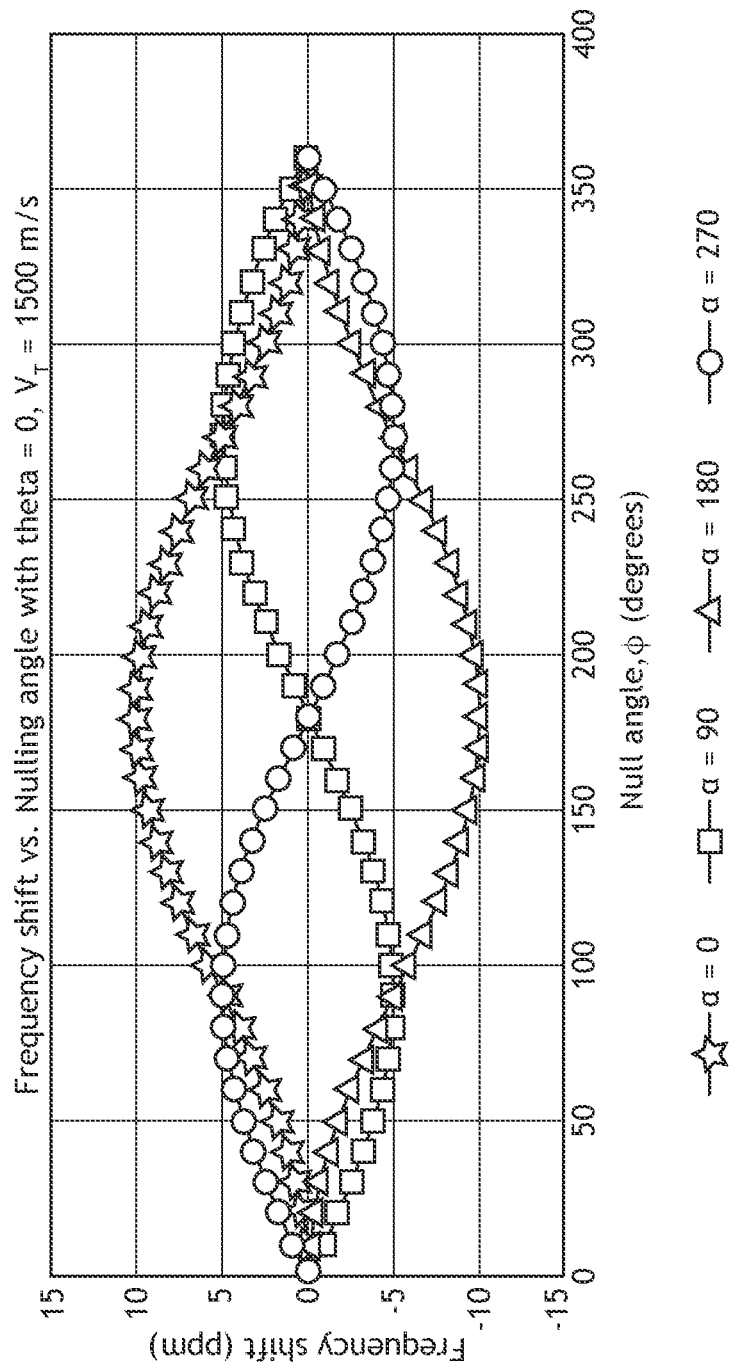
FIG. 2A is a graphical representation of frequency shift profiles within the MANET of FIG. 1.
Figure 2B:
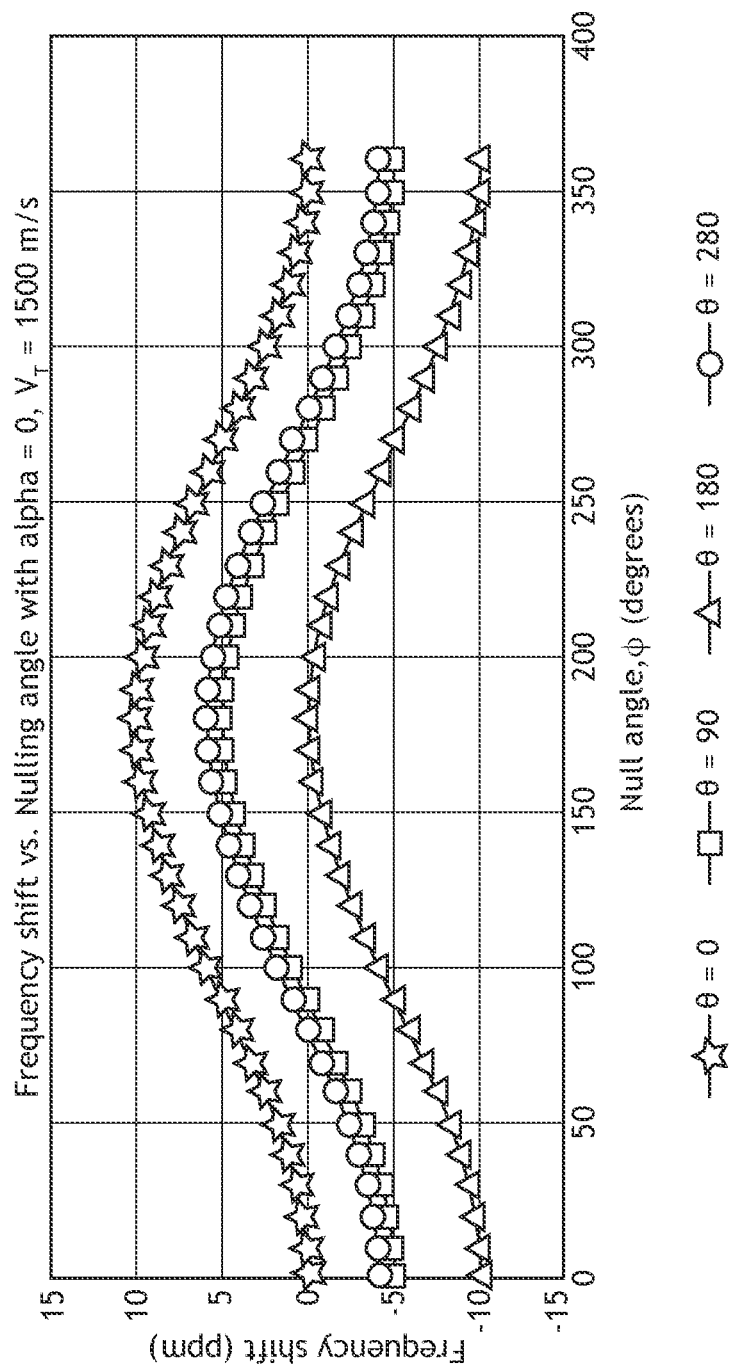
FIG. 2B is a graphical representation of frequency shift profiles within the MANET of FIG. 1.

FIG. 2A shows the resulting net frequency shift as a function of the 'Null' direction for scenarios where a stationary receiver is East of the transmitter (theta=0), and with a transmitter speed of 1500 meters per second (m/s). FIG. 2B shows the results for a stationary receiver and for several directions with an Eastern transmitter node velocity direction (alpha=0). The frequency shifts are in units of parts per million (ppm). As shown in FIGS. 2A and 2B, the amplitude is consistent with the transmitter node's 102 speed of 5 ppm $[|\vec{V_T}|/c*(1\times10^6)]$ regardless of the velocity direction or position, the net frequency shift is zero when the 'Null' angle is in the receiver direction (when $\phi$=8), and the minimum occurs when the 'Null' is aligned with the transmitter node's 102 velocity direction (when 1=a).

From the profile, the receiver node 104 can therefore determine the transmitter node's 102 speed, the transmitter node's 102 heading, and the direction of the transmitter node 102 is known to at most, one of two locations (since some profiles have two zero crossings). It should be noted that the two curves cross the y axis twice (0 & 180 degrees in FIG. 2A, and ±90 degrees in FIG. 2B) so there is initially an instance of ambiguity in position direction. In this case the receiver node 104 knows the transmitter node 102 is either East or West of the receiver node 104.

Figure 3:
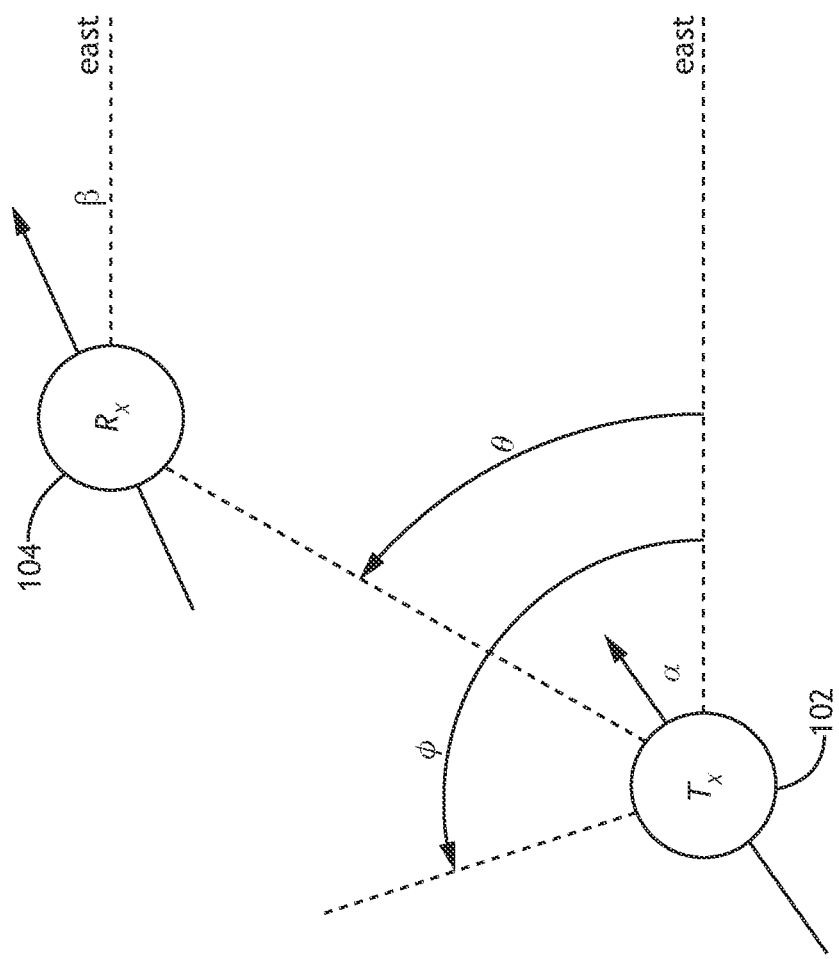
FIG. 3 is a diagrammatic illustration of a transmitter node and a receiver node according to example embodiments of this disclosure.

Referring to FIG. 3, a multi-node communications network 100 is disclosed. The multi-node communications network 100 may include multiple communications nodes, e.g., a transmitter (Tx) node 102 and a receiver (Rx) node 104. As shown in FIG. 3 both of the transmitter node 102 and the receiver node 104 are in motion in two dimensions.

The simultaneous movement scenario is depicted in FIG. 3 where the receiver node 104 is also moving in a generic velocity characterized by a speed $|\vec{V_R}|$ and the direction, $\beta$. The protocol for the moving receiver node 104 incorporates a frequency adjustment on the receiver node's 104 side to compensate for the receiver node's 104 motion as well. The equations have two additional terms. One is a Doppler term for the motion of the receiver and the second is frequency compensation by the receiver.

Again, the Doppler shift is a physical phenomenon due to motion and can be considered as a channel effect, but in this case both the transmitter node 102 and the receiver node 104 are moving so there are two Doppler shift terms. The true Doppler shift as seen by the receiver due to the relative radial velocity is:

$$\frac{\Delta f_{DOPPLER}}{f} = \frac{|\vec{V_T}|}{c}\cos(\theta - \alpha) - \frac{|\vec{V_R}|}{c}\cos(\theta - \beta)$$

The other factors are the transmitter node 102 and receiver node 104 frequency adjustment terms that exactly compensates the Doppler shift when the 'Null' direction aligns with the receiver direction. It is the job of the transmitter node 102 to adjust the transmitter node's 102 transmit frequency according to its own speed ($|\vec{V_T}|$), and velocity direction ($\alpha$). That transmitter node frequency adjustment is proportional to the velocity projection onto the 'Null' direction ($\phi$) and is the first term in the equation below.

It is the job of the receiver node 104 to adjust the receiver node frequency according to the receiver node's 104 own speed ($|\vec{V_R}|$), and velocity direction ($\beta$). That receiver node frequency adjustment is proportional to the velocity projection onto the 'Null' direction ($\Phi$) and is the second term in the equation below. The receiver node frequency adjustment can be done to the receive signal prior to the frequency resolving algorithm or could be done within the algorithm.

$$\frac{\Delta f_{T\&R}}{f} = -\frac{|\vec{V_T}|}{c}\cos(\varphi - \alpha) + \frac{|\vec{V_R}|}{c}\cos(\varphi - \beta)$$

The net frequency shift seen by the receiver is the sum of all terms:

$$\frac{\Delta f_{net}}{f} = \frac{|\vec{V_T}|}{c}[\cos(\theta - \alpha) - \cos(\varphi - \alpha)] - \frac{|\vec{V_R}|}{c}[\cos(\theta - \beta) - \cos(\varphi - \beta)]$$

Again, it is assumed that the receiver node 104 has an implementation that resolves the frequency of the incoming signal, as would be understood in the art.

Also, it is assumed that the velocity vector and direction changes slowly compared to the periodic measurement of $\Delta f_{net}$. Again, under such conditions, the unknown parameters (from the perspective of the receiver node 104) $\alpha$, $|V_T|$, and 0 are constants. When the velocity vector or direction change faster, then this change could be tracked, for example if the change is due to slow changes in acceleration.

Figure 4A:
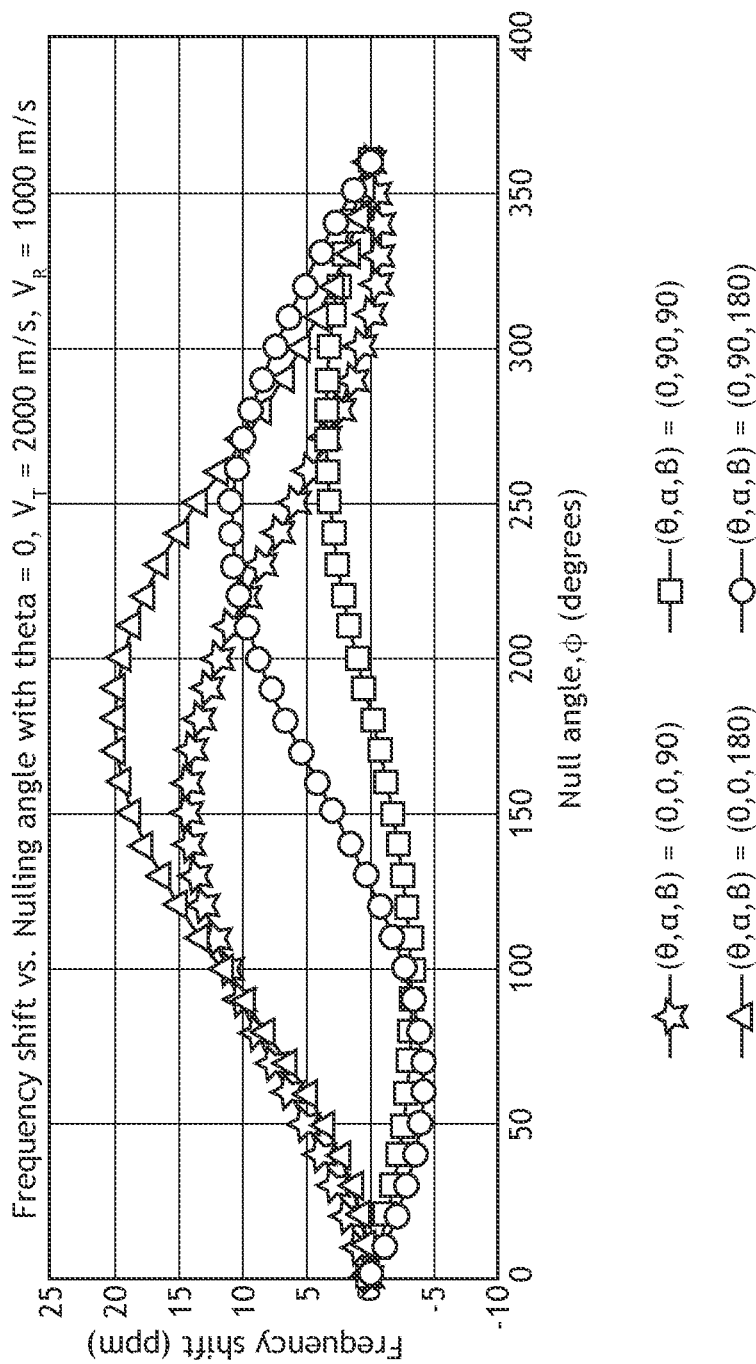
FIG. 4A is a graphical representation of frequency shift profiles within the MANET of FIG. 3.
Figure 4B:
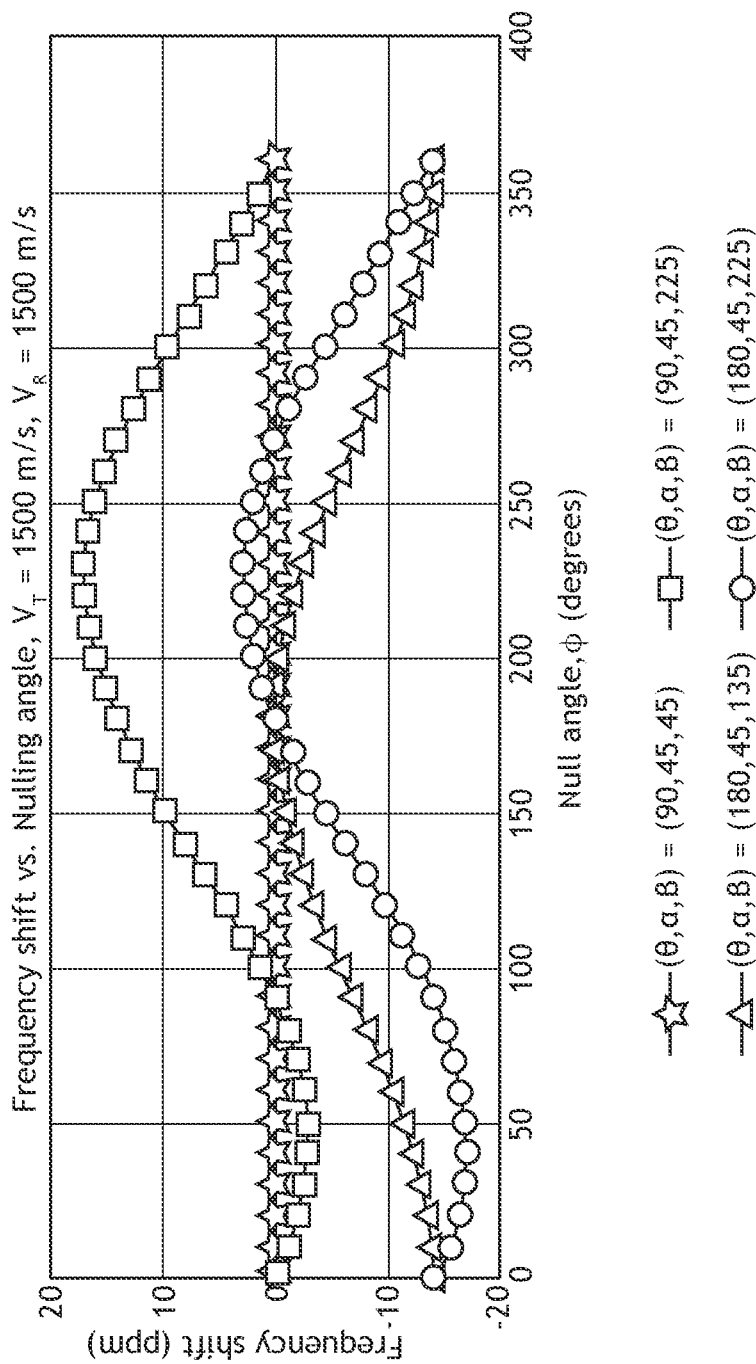
FIG. 4B is a graphical representation of frequency shift profiles within the MANET of FIG. 3.

The net frequency shift for the two-dimensional (2D) moving receiver node 104 approach is shown in FIGS. 4A and 4B for several scenario cases of receiver node location, $\theta$, and transmitter node and receiver node speeds ($|\vec{V_T}|$ & $|\vec{V_R}|$), as well as transmitter node and receiver node velocity direction ($\alpha$ and $\beta$). FIG. 4A has different speeds for the transmitter node 102 and receiver node 104 as well as the receiver node location of $\theta$=0. FIG. 4B has the same speed for the transmitter node and receiver node. Similarly, there are three concepts to notice here:

The amplitude is consistent with the relative velocity between transmitter node 102 and receiver node 104 $[|(|\vec{V_T}|\cos(\alpha)-|\vec{V_R}|\cos(\beta))|/c*(1e6)]$.

The net frequency shift is zero when the 'Null' angle is in the receiver direction (when $\phi$=$\theta$).

The minimum occurs when the 'Null' is aligned with the relative velocity direction (when $\phi$=angle($|\vec{V_T}|\cos(\alpha)-|\vec{V_R}|\cos(\beta)$)).

Again, there is an initial dual point ambiguity with the position, $\theta$, but the transmitter node's 102 speed and velocity vector is known.

Figure 5:
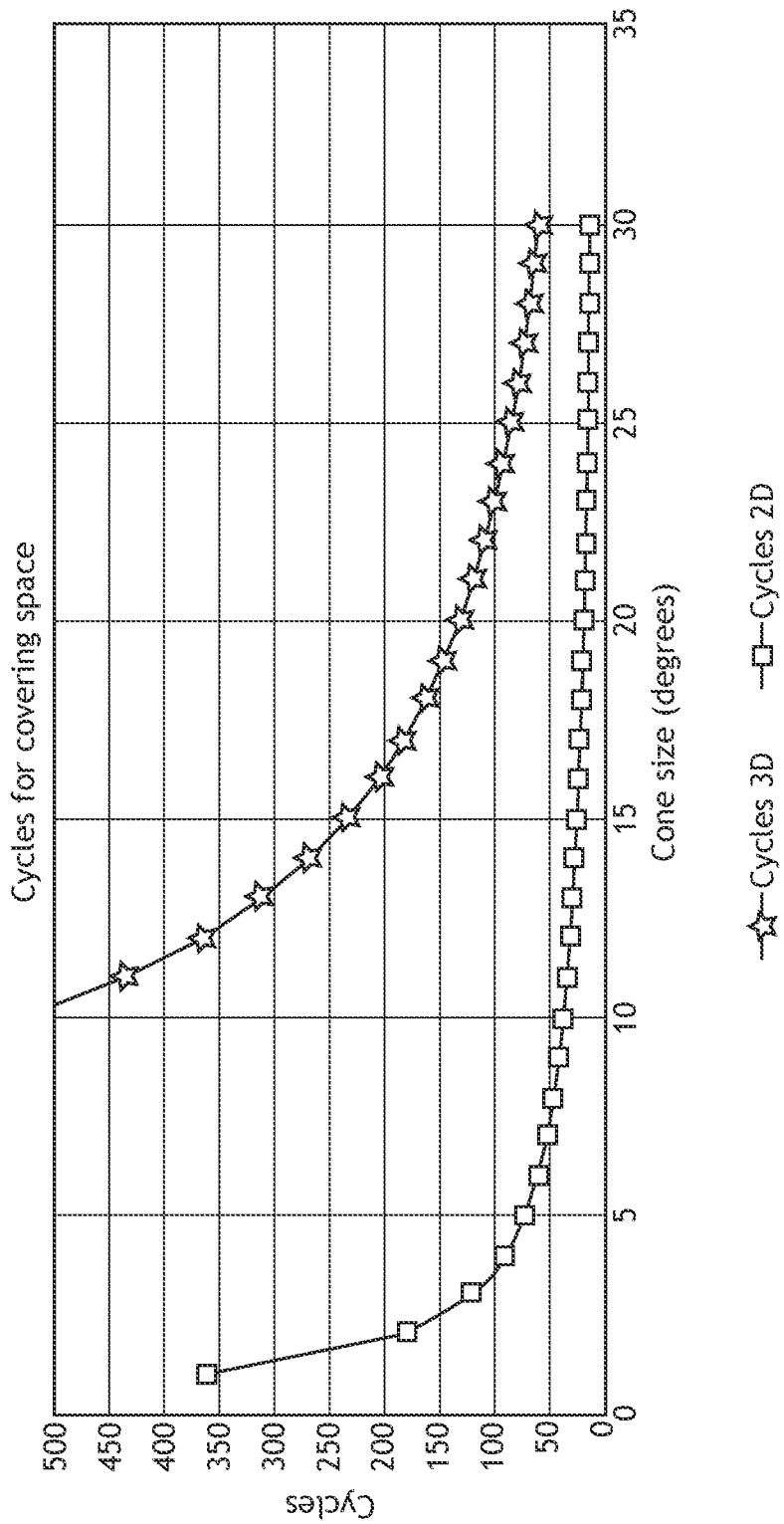
FIG. 5 is a graph of sets for covering space.

Referring now to FIG. 5, while the 2D picture is easier to visualize, the same principles apply to the 3D case. FIG. 5 shows a number of direction sets needed to span 3D and 2D space with different cone sizes (cone sizes are full width). Before diving into the equations, it's worth commenting on the size of the space when including another dimension. For example, when a 'Null' step size of 10 degrees was used in the previous examples, it took 36 sets to span the 360 degrees in 2D. Thus, if an exemplary detection angle of 10 degrees is used (e.g., a directional antenna with 10-degree cone) it would take 36 sets to cover the 2D space. The 3D fractional coverage can be computed by calculating the coverage of a cone compared to the full 4 pi steradians. The fraction is equal to the integral $$FractionCoverage3D = \frac{\int_0^{ConeSize/2} r^2 \sin(\theta')d\theta'd\varphi}{4\pi r^2} = \frac{1-\cos(ConeSize/2)}{2}$$

$$FractionCoverage2D = 2\pi/ConeSize$$

The number of sets to span the space is shown in FIG. 5 for both the 2D and 3D cases which correlates with discovery time. Except for narrow cone sizes, the number of sets is not drastically greater for the 3D case (e.g., approximately 15 times at 10 degrees, 7 time at 20 degrees, and around 5 times at 30 degrees). Unless systems are limited to very narrow cone sizes, the discovery time for 3D searches is not overwhelming compared to a 2D search.

Figure 6:
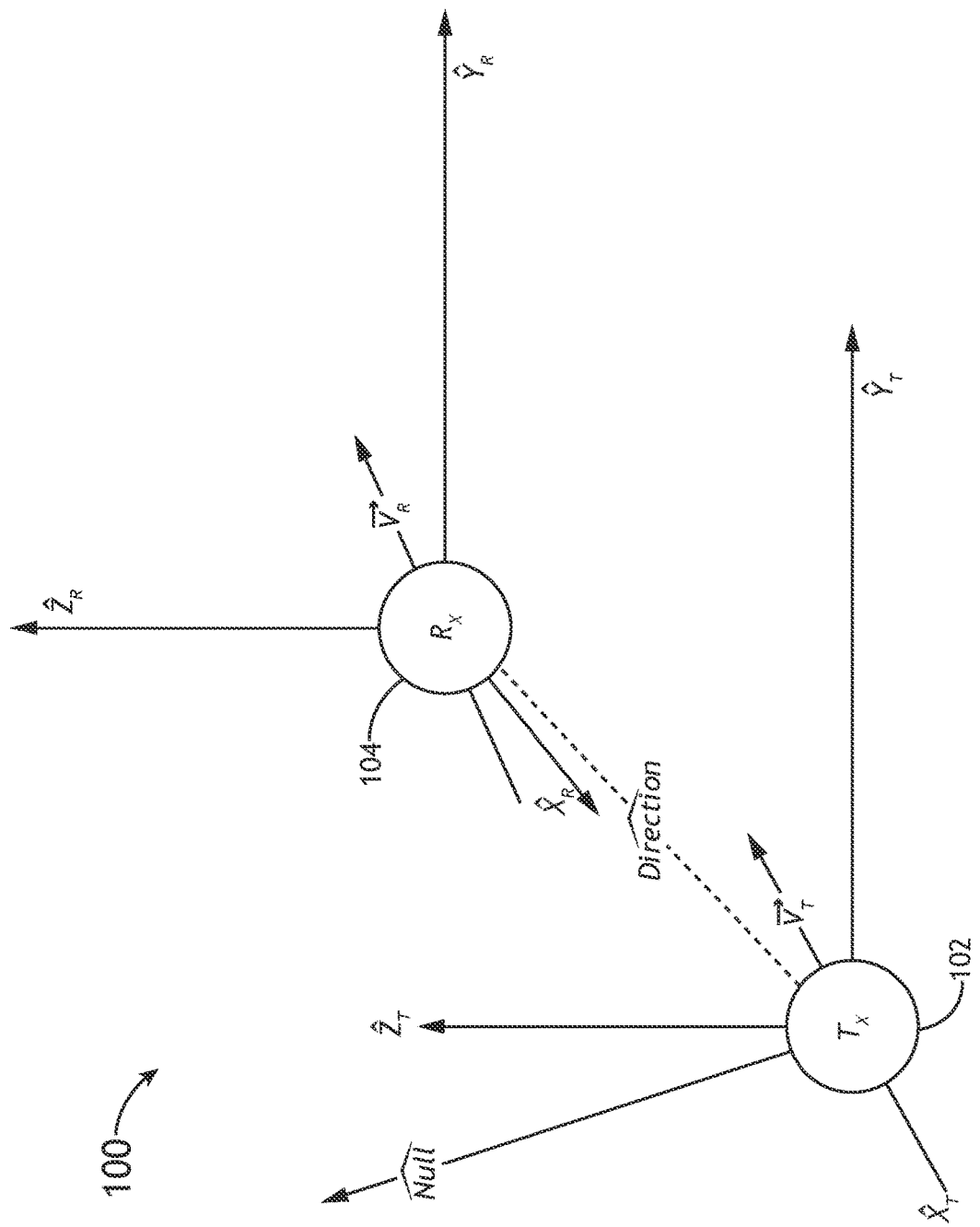
FIG. 6 is a diagrammatic illustration of a transmitter node and a receiver node according to example embodiments of this disclosure.

Referring now to FIG. 6, a multi-node communications network 100 is disclosed. The multi-node communications network 100 may include multiple communications nodes, e.g., a transmitter (Tx) node 102 and a receiver (Rx) node 104. As shown in FIG. 6 both of the transmitter node 102 and the receiver node 104 are in motion in three dimensions.

The 3D approach to Doppler nulling follows the 2D approach but it is illustrated here with angles and computed vectorially for simplicity.

In three dimensions, it is convenient to express the equations in vector form which is valid for 2 or 3 dimensions. FIG. 6 shows the geometry in 3 dimensions where $\widehat{Direction}$ is the unit vector pointing to the receiver from the transmitter, and $\widehat{Null}$ is the unit vector pointing in the 'Null' direction defined by the protocol.

The true Doppler shift as seen by the receiver node 104 due to the relative radial velocity which is the projection onto the $\widehat{Direction}$ vector:

$$\frac{\Delta f_{DOPPLER}}{f} = \frac{1}{c}\vec{V_T}\cdot\widehat{Direction} - \frac{1}{c}\vec{V_R}\cdot\widehat{Direction}$$

The nulling protocol adjusts the transmit node frequency and receiver node frequency due to their velocity projections onto the $\widehat{Null}$ direction $$\frac{\Delta f_T}{f} = -\frac{1}{c}\vec{V_T}\cdot\widehat{Null} + \frac{1}{c}\vec{V_R}\cdot\widehat{Null}$$

The net frequency shift seen by the receiver node 104 is the sum of all terms:

$$\frac{\Delta f_{net}}{f} = \frac{1}{c}\vec{V_T}\cdot\widehat{Direction} - \frac{1}{c}\vec{V_R}\cdot\widehat{Direction} - \frac{1}{c}\vec{V_T}\cdot\widehat{Null} + \frac{1}{c}\vec{V_R}\cdot\widehat{Null}$$

The net frequency shift for the 3D moving receiver node 104 approach is not easy to show pictorially but can be inspected with mathematical equations to arrive at useful conclusions. The first two terms are the Doppler correction (DC) offset and the last two terms are the null dependent terms. Since the $\widehat{Null}$ is the independent variable, the maximum occurs when $(\vec{V_R}-\vec{V_T})$ and $\widehat{Null}$ are parallel and is a minimum when they are antiparallel. Furthermore, the relative speed is determined by the amplitude, $$Amplitude = \frac{1}{c}|\vec{V_R}-\vec{V_T}|$$

Lastly, the net frequency is zero when the $\widehat{Null}$ is parallel (i.e., parallel in same direction, as opposed to anti-parallel) to $\widehat{Direction}$..

$$\frac{\Delta f_{net}}{f} = 0 \text{ when,}$$

$$\frac{1}{c}\vec{V_T}\cdot\widehat{Direction} - \frac{1}{c}\vec{V_R}\cdot\widehat{Direction} = \frac{1}{c}\vec{V_T}\cdot\widehat{Null} - \frac{1}{c}\vec{V_R}\cdot\widehat{Null} \text{ or,}$$

$$(\vec{V_T}-\vec{V_R})\cdot\widehat{Direction} = (\vec{V_T}-\vec{V_R})\cdot\widehat{Null}$$

For the 3D case:
The amplitude is consistent with the relative velocity between transmitter node 102 and receiver node 104 $[|\vec{V_R}-\vec{V_T}|/c]$.
The net frequency shift is zero when the 'Null' angle is in the receiver node direction, $(\vec{V_T}-\vec{V_R})\cdot\widehat{Direction}=(\vec{V_T}-\vec{V_R})\cdot\widehat{Null}$).
The minimum occurs when the 'Null' is aligned with the relative velocity direction.

Referring still to FIG. 6, in some embodiments, the system (e.g., the multi-node communications network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors, wherein the controller 106 has information of own node velocity and own node orientation. The transmitter node 102 and the receiver node 104 may be in motion (e.g., in two dimensions or in three dimensions). The transmitter node 102 and the receiver node 104 may be time synchronized to apply Doppler corrections associated with said node's own motions relative to a common reference frame (e.g., a common inertial reference frame (e.g., a common inertial reference frame in motion or a stationary common inertial reference frame)). The common reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile ad-hoc network (MANET) comprising the transmitter node 102 and the receiver node 104.

In some embodiments, the applying of the Doppler corrections associated with the receiver node's own motions relative to the common reference frame is based on a common reference frequency. For example, a common reference frequency may be adjusted by a node's own motions to cancel out those motions in reference to the null angle. This common reference frequency may be known by each node prior to transmission and/or reception of the signals. In some embodiments, calculating the net frequency change seen by the receiver node 104 is based on the common reference frequency. For example, the net frequency change may be a difference between a measured frequency of the signals and the common reference frequency.

For purposes of discussing the receiver node 104, a "source" generally refers to a source of a received signal, multiple sources of multiple signals, a single source of multiple signals, and/or the like. For example, a source may be a transmitter node 102 configured to apply Doppler corrections as disclosed herein and in applications from which priority is claimed and/or incorporated by reference. In this regard, a receiver node 104 may determine one or more attributes of the source (e.g., bearing between the receiver node 104 and the source, bearing of the velocity of the source, amplitude/speed of the velocity, range, and the like). In some embodiments, the receiver node 104 and the source (e.g., transmitter node 102) are configured to use a same, compatible, and/or similar Doppler correction, protocol, common reference frame, common reference frequency, time synchronization, and/or the like such that the receiver node 104 may determine various attributes of the source. Note, in some embodiments, that one or more of these may be known ahead of time, be determined thereafter, included as fixed variable values as part of the protocol, and/or determined dynamically (in real time) as part of the protocol. For example, the protocol may determine that certain common reference frames should be used in certain environments, such as using GPS coordinates on land and a naval ship beacon transmitter common reference frame location (which may be mobile) over certain areas of ocean, which may dynamically change in real time as a location of a node changes.

In some embodiments, the transmitter node 102 and the receiver node 104 are time synchronized via synchronization bits associated with acquisition. For example, the synchronization bits may operate as physical layer overhead.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node 102 velocity projection onto a Doppler null direction, wherein an amount of adjustment of the adjusted receiver frequency is proportional to a receiver node 104 velocity projection onto the Doppler null direction. In some embodiments, the receiver node 102 is configured to determine a relative speed between the transmitter node 102 and the receiver node 104. In some embodiments, the receiver node 104 is configured to determine a direction that the transmitter node 102 is in motion and a velocity vector of the transmitter node 102. In some embodiments, a maximum net frequency shift for a Doppler correction by the receiver node 104 occurs when a resultant vector is parallel to the Doppler null direction, wherein the resultant vector is equal to a velocity vector of the receiver node 104 minus the velocity vector of the transmitter node 102. In some embodiments, a minimum net frequency shift for a Doppler correction by the receiver node 104 occurs when a resultant vector is antiparallel to the Doppler null direction, wherein the resultant vector is equal to a velocity vector of the receiver node 104 minus the velocity vector of the transmitter node 102. In some embodiments, a net frequency shift for a Doppler correction by the receiver node 104 is zero when a vector pointing to the receiver node from the transmitter node 102 is parallel to the Doppler null direction.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing a transmitter node and a receiver node, wherein each node of the transmitter node and the receiver node are time synchronized, wherein each node of the transmitter node and the receiver node are in motion, wherein each node of the transmitter node and the receiver node comprises a communications interface including at least one antenna element, wherein each node of the transmitter node and the receiver node further comprises a controller operatively coupled to the communications interface, the controller including one or more processors, wherein the controller has information of own node velocity and own node orientation.

A step 704 may include based at least on the time synchronization, applying, by the transmitter node, Doppler corrections to the transmitter node's own motions relative to a common reference frame.

A step 706 may include based at least on the time synchronization, applying, by the receiver node, Doppler corrections to the receiver node's own motions relative to the common reference frame, wherein the common reference frame is known to the transmitter node and the receiver node prior to the transmitter node transmitting signals to the receiver node and prior to the receiver node receiving the signals from the transmitter node.

Further, the method 700 may include any of the operations disclosed throughout.

The null scanning technique discussed herein illustrates a system and a method for spatial awareness from resolving the temporal spatial characteristics of the transmitter node's 102 radiation. This approach informs the receiver node 104 of the relative speed between the transmitter node 102 and receiver node 104 as well as the transmitter node direction and transmitter node velocity vector. This approach includes scanning through all directions and has a high sensitivity (e.g., low net frequency shift) when the null direction is aligned with the transmitter node direction. This approach can be implemented on a highly sensitive acquisition frame which is typically much more sensitive than explicit data transfers which allow for the ultra-sensitive spatial awareness with relatively low power.

This sentence may mark an end to the (at least partially) reproduced language from U.S. patent application Ser. No.

17/857,920 corresponding to the (at least partially) reproduced FIGS. 1-7. However, note that this paragraph is nonlimiting, and changes may have been made and language added or removed, and not all the language above or corresponding figures are necessarily reproduced from U.S. patent application Ser. No. 17/857,920.

Directional radio frequency (RF) networks often must spend significant time scanning the physical space over which potential RF network signals may exist. For example, a system scanning spherical space in azimuth and elevation may require numerous discrete time intervals to accomplish the task. Generally, a receiver dwells for a finite amount of time within each spatial sector looking for a desired signal; hence, total discovery time becomes dwell time multiplied by the number of discrete time intervals needed for the receiver to search the entire physical space. Because scanning may be a lengthy process, often it becomes necessary to sacrifice other important system performance metrics to ensure timely discovery performance.

Directional doppler nulling may be an enabling technology for reducing discovery time within directional networks, thereby allowing for improvement in other performance metrics as well. Because of the significantly improved discovery time, directional Doppler-nulling may also be enabling technology for low-probability of detection (LPD) directional networks.

Transmission of explicit position information (e.g., GPS coordinates using two-way higher-bandwidth communications) and/or velocity information is not necessarily needed to obtain such information when using Doppler-nulling. In embodiments, Doppler is minimized (or "nulled") via Doppler corrections in each direction an antenna is pointing based on at least a velocity of a node (e.g., which may be equally true for transmitter and receiver). Further, improved communication between nodes becomes possible whenever antennas are pointing toward each other. In embodiments, range to another node can be determined from the use of precisely-defined transmission intervals, as the transmission time in each can be known, a priori, to both the transmitter and receiver. With bearing angle, range, and relative velocity between nodes known via the Doppler-nulling protocol, it becomes possible to precisely discover and track another node's position without using any explicit data transfer (e.g., WiFi, Bluetooth, longer range similar bandwidth aerospace communication protocols, and/or the like).

The deep-noise addition to Doppler-nulling (e.g., U.S. patent application Ser. No. 17/534,061) may offer a viable mechanism for terminals to synchronize across long distances using very low power, thus minimizing potential for transmitter observation by an out-of-network receiver or interference to an out-of-network receiver.

In embodiments (i.e., in at least some embodiments) with Doppler-nulling, both the transmitting terminal (e.g., Tx node 102) and the receiving terminal can initially use rather wide beams in order to facilitate terminal discovery and establish an initial terminal-to-terminal link. In embodiments, it then becomes possible to narrow the beam to allow high data rate communications with increased transmitter effective isotropic radiated power (EIRP) within the higher gain smaller spot beam coverage. In this regard, an advantage of the present disclosure is that Doppler-nulling may support relatively precise antenna pointing for high gain narrow highly-focused antenna beams. Higher data rate communication over longer distance is thus possible with the narrow spot beam pattern than could have been achieved with a broader beam typically used for timely initial discovery and acquisition.

In embodiments, the Doppler-nulling technique allows each platform (e.g., node) to correct own-platform Doppler. In general, in at least some embodiments, exchanging position and velocity information between platforms is unnecessary with directional Doppler-nulling; thus, less signal-in-space overhead is needed to maintain communication, fewer signal tracking resources are required, and there is reduced (or zero) inherent time lag in tracking. Relative position information may be discerned from the periodic Doppler-nulling pulses which enable accurate antenna pointing between platforms.

Examples of doppler nulling methods include, but are not limited to, methods and other descriptions (e.g., at least some theory and mathematical basis) are disclosed in U.S. patent application Ser. No. 17/233,107, filed Apr. 16, 2021, which is hereby incorporated by reference in its entirety; U.S. patent application Ser. No. 17/534,061, filed Nov. 23, 2021, which is hereby incorporated by reference in its entirety; and U.S. patent application Ser. No. 17/857,920, filed Jul. 5, 2022, which is hereby incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like). Embodiments of the present disclosure may extend doppler nulling using directional systems to achieve relatively large efficiency improvements (e.g., lower power requirements, farther range, faster discovery times, and/or the like).

Because Doppler-nulling doesn't necessarily require an explicit digital data information transfer, directional Doppler-nulling may allow for discovery of network nodes scattered throughout a large physical space using less energy than is possible with more conventional techniques relying on explicit digital data transfer.

Moreover, without node-to-node transfer of digital information, Doppler-nulling may offer an order-of-magnitude signal detection improvement compared to conventional systems utilizing digital data to exchange position and velocity information. In some embodiments, in terms of distance, such performance improvements correspond with a range increase of about three times (or more) in favor of the Doppler-nulling approach.

The order-of-magnitude performance differential may correspond with an approximately 10 dB advantage for Doppler-nulling which can be used to expedite network routing significantly. Alternatively, when a three times range advantage is not needed, discovery power could be lowered by 10 dB while still retaining the full system range needed for subsequent digital data transfer. Lower power transmission during discovery means less interference in directions where no network nodes exist and also less chance for the discovery signal to be detected by adversarial systems.

In embodiments, to achieve a detection time improvement, a 10 dB power advantage might be distributed over 10 times the discovery space (i.e., using a wider transmit beam); thus, allowing discovery to be conducted in only 10% the time needed for a conventional system. Upon discovery and acquisition, the directional transmit beam could then quickly be narrowed to support higher speed data transfer at the same distance.

In embodiments, directional Doppler-nulling allows each node in a directional network to compensate for its own individual Doppler shift, whether in the direction of transmission or the direction of reception. This is a simpler arrangement than requiring either the transmitter or the receiver to correct all system Doppler.

In embodiments, directional systems with Doppler-nulling may operate with some constraints, as the received signal may be unlikely to remain above the noise level except when transmit antenna and receive antenna point generally in the direction of each other. Thus, maximum signal strength may only periodically be available at the intended receiver. Fortunately, antenna directionality can be combined with Doppler-nulling, via embodiments of the present disclosure, to enable increased sensitivity at the moments during the Doppler-nulling scan when the transmit antenna and the receive antenna point generally toward each other. At these moments during the scan, communication between nodes becomes possible.

Figure 10:
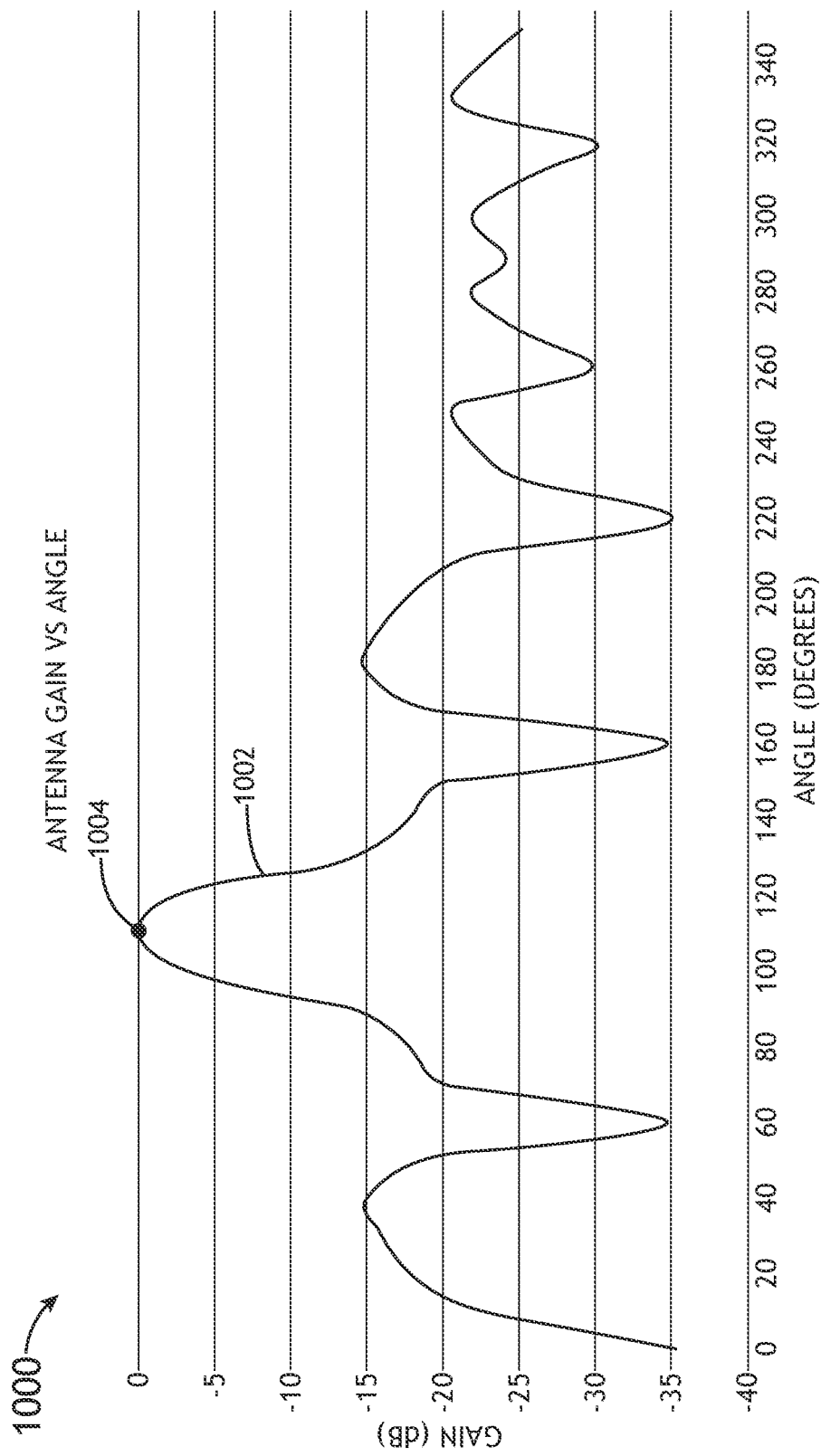
FIG. 10 is a graphical representation of an angular distribution of antenna gain versus angle, according to one or more embodiments of the present disclosure.

Referring to FIG. 10, a graphical representation 1000 of an angular distribution of antenna gain 1002 versus angle (e.g., receiving angle of a signal) is illustrated, according to one or more embodiments of the present disclosure. For example, an alignment of antenna directivity of a receiver node 104 and/or transmitter node 102 is illustrated. As described below for FIG. 11, a peak antenna gain 1004 bearing angle (e.g., first bearing angle) may be used to determine bearing angle and combined with Doppler nulling methods bearing angles (e.g., second bearing angle) to achieve a more precise bearing angle.

FIG. 10 shows antenna gain 1002 for a single transmit or receive antenna element across 360 degrees. Combining antenna gain for both a receiver node and transmitter node pointing at each other would result in double the decibels of antenna gain 1002. Therefore, in this way, aligning both directional antennas provides a generally desirable high antenna gain compared to omnidirectional (unaligned) antennas or only one aligned antenna. However, aligning the antenna using other conventional methods often requires time-consuming and inefficient scanning patterns and may not result in a precise/narrow estimate of bearing angle.

Figure 11:
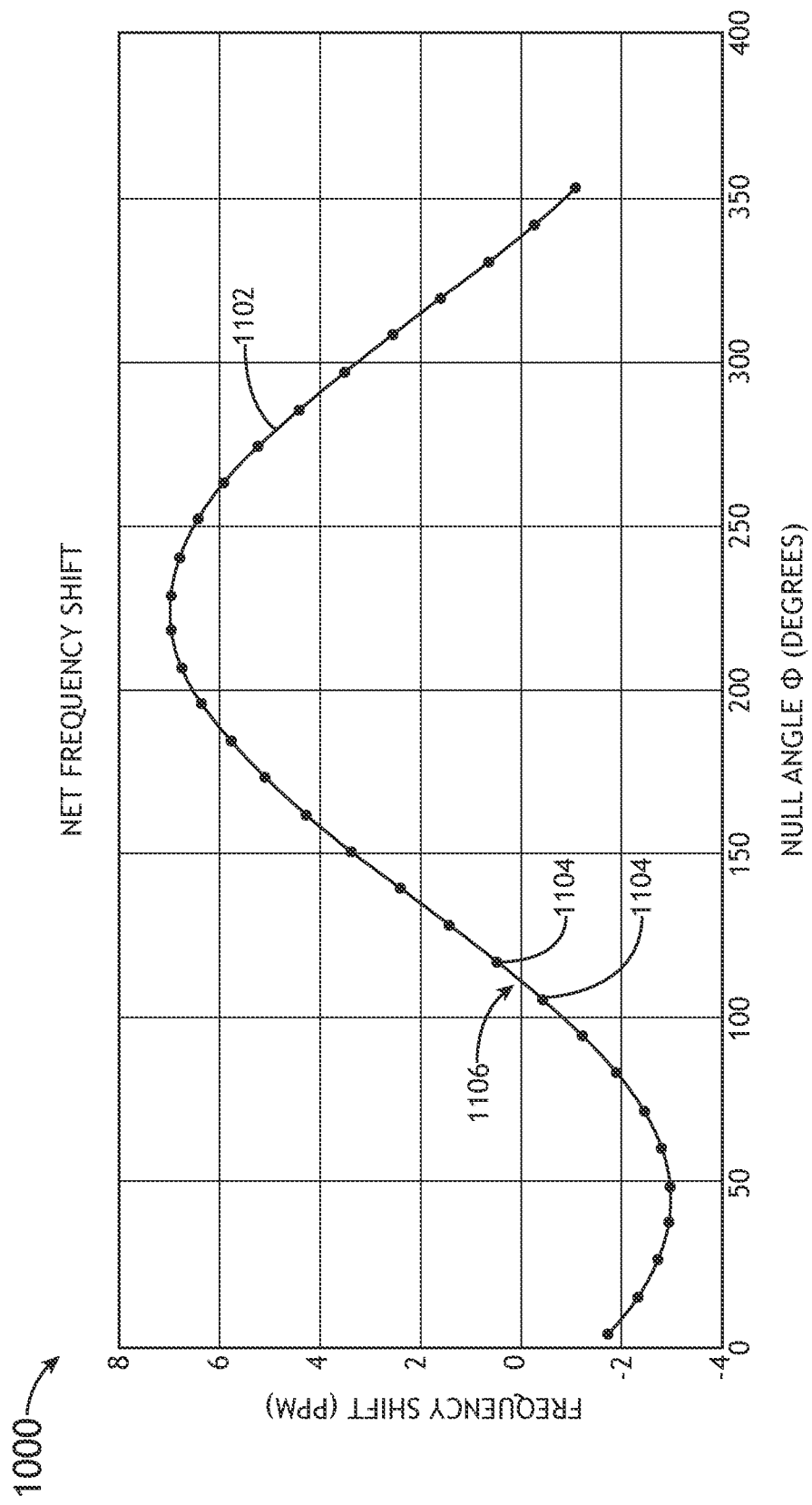
FIG. 11 is a graphical representation of net frequency shift points and a frequency shift profile including a zero crossing based on the net frequency shift points, according to one or more embodiments of the present disclosure.

FIG. 11 shows a graphical representation 1100 of net frequency shift points 1104 and a frequency shift profile 1102 (e.g., function) including a zero crossing 1106 based on the net frequency shift points 1104, according to one or more embodiments of the present disclosure.

Generally, in embodiments, in contrast to a rather less precise amplitude peak 1004 generally achievable with directional antenna pointing alone, Doppler-nulling may be used to generate a more sharply-defined and/or faster estimation of bearing angle as shown by the zero crossing 1106 as seen in FIG. 11. The peak 1004 of a smooth curve of antenna gain 1002 is generally more difficult to pin-point than a zero crossing/intersection point of two lines. The zero crossing 1106 crosses zero at about 110 degrees. In embodiments, the zero crossing 1106 may be used alone, and/or in combination with the amplitude peak 1004 from antenna pointing to provide a more precise indication of bearing angle between nodes than is possible using antenna pointing alone.

In embodiments, Doppler-nulling may allow for determining the net frequency shift points 1104. Consider a nonlimiting scenario of a static receiver node 104. In such a scenario, a net frequency shift point 1104 may be a value indicative of a difference between a (known) common reference frequency and a measured frequency of a received pulse. See, e.g., pulse 804 in FIG. 8. Conceptually, this difference may be zero if the transmitter node 102 happens to direct the pulse perfectly at the receiver node 104 and applies a Doppler correction associated with the transmitter node's 102 own motions to cancel out real-world physically induced Doppler effects on the pulse (i.e., equal to zero when the static receiver's measured pulse frequency=common reference frequency). Furthermore, if the common reference frame is also static over time and if the pulse is close to being aimed at the receiver 104 (e.g., within 6 degrees), then the net frequency shift points 1104 may have a value that is "near zero". The labeled points 1104 in FIG. 11 are "near zero" net frequency shift points 1104. Such points 1104 may, for example, be used to generate a function such as a linear line which is fit to the points 1104, or any other function (e.g., sinusoidal function). Next, such a function may be used to solve for (e.g., interpolate) the zero crossing 1106 using any interpolation method known in the art. In this regard, one or more net frequency shift points 1104, such as "zero-related values" comprising: "zero", "zero crossing" 1106", and/or "near zero" values/functions or the like may be used to determine a bearing angle (θ) between the receiver node 102 and a source (e.g., transmitter node 102).

In embodiments, the function/slope 1102 may be generated using net frequency shift points 1104. For instance, the function may be a sinusoidal function, a linear function fitted to the net frequency shift points 1104 using any fitting function known in the art, or the like.

By using a zero-crossing the function/slope 1102, a continuous interpolation between coarse antenna pointing angle increments is supported, and thus a more precise indication of bearing angle may be achieved compared to signal amplitude alone at successive antenna positions. A (limited segment) of a zero-crossing 1106 may be determined using a few (e.g., 2 or more) points 1104 may allow for reconstruction/extrapolation/curve-fitting of an entire Doppler net frequency profile 1102 using just the few sample points 1104. In embodiments, both bearing and differential velocity may be derived from the approximated frequency shift profile 1102 using three or more data points 1104. (Note that such a three data point requirement may imply, in some embodiments, some overlap in coverage between subsequent antenna beams. At least three points are generally needed to approximate a curve, but a larger number of data points for a curve may be available.)

Figure 8:
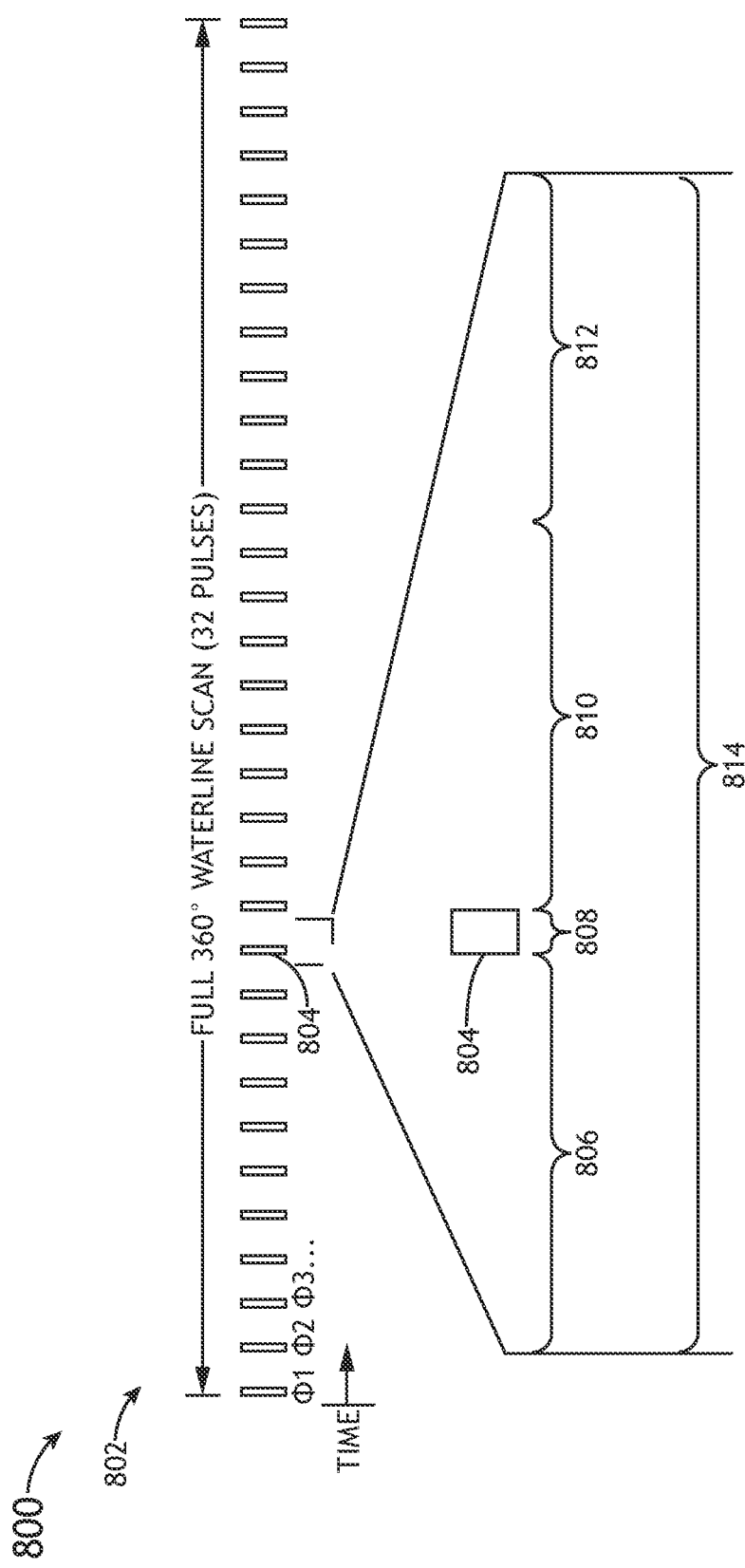
FIG. 8 is a time-based graphical representation of a plurality of pulses of a scanning sequence, according to one or more embodiments of the present disclosure.

FIG. 8 is a time-based graphical representation 800 of a plurality of pulses 804 of a scanning sequence 802, according to one or more embodiments of the present disclosure. For example, any quantity of pulses 804 in various directions (e.g., 2D, 3D) may be used. Note that the sequence may be incremental (e.g., 10 degrees, 20 degrees, 30 degrees, etc.), pseudo-random (e.g., a random pattern known by all nodes, a priori, according to a protocol; 10 degrees, 240 degrees, 40 degrees, etc.), and/or the like.

In embodiments, a quantity of the plurality of pulses 804 is generally between 2 and 300. (Note that similarly to the Nyquist criteria, the minimum number of required points for reconstructing the sine wave here is greater than two. Rapid acquisition over a single cycle requires, for practical purposes, three pulses. The upper end for number of samples, while technically unbounded, like any other over-sampled system exhibits diminishing returns after an order of magnitude or two. As a result, a realistic upper end for number of samples per cycle is around 300.) For example, the quantity may be 32 as shown. In another example, the quantity may vary according to fixed sequence patterns and/or according to any protocol variables (e.g., type of desired receiver node (e.g., drone, aircraft, cellular device, etc.), type of transmitter node, location, time of day, and/or the like). For instance, different types of devices may be configured to use different scanning sequences/protocols. By way of another example, a sequence may cycle between using a lower quantity of wide beams and then a higher quality of narrow beams. Note that such examples are nonlimiting and any scanning sequence (or subsets of scanning sequences) at any time may be used based on any method.

Generally, the phrase "the signals correspond to at least a portion of the pulses 804", and the like, means that the signals (e.g., received waveforms from antenna element, etc.) correspond to (e.g., could be paired to, and/or are generated based on) at least a portion of a set of theoretical pulses 804 of a scanning sequence 802 used to generate the signals. For example, if both a source (e.g., transmitter node 102) and receiver node 104 are synced to a scanning sequence 802, then the receiver node 104 may be configured to parse the (received) signals into pulses 804 that could be mapped/paired to the pulses 804 of the scanning sequence 802. Here, a "portion" of the set of theoretical pulses 804 means that not all of the pulses 804 are necessarily received.

"Time synced" and the like may mean that each node is aware of an absolute time within a cycle of a scanning sequence 802 such that any time-of-arrival of a received pulse 804 may be mapped to its location in a graphical representation 800 of the scanning sequence or the like (e.g., mapped along the horizontal axis of FIG. 11). For example, a controller may keep track of an absolute sync time and a local receive time, such that the local receive time may be converted to the absolute sync time. Such a corresponding relationship may be used, as shown in FIG. 8 and FIG. 11, to determine a transmitting angle (e.g., $\phi 1, \phi 2, \phi 3 \ldots$). Such time-of-arrival syncing isn't necessarily perfectly accurate or predictable. For example, the scanning sequence may include transmitter node and receiver node time uncertainty (error) margins 806, 810 on either side of the pulse 804 and/or a propagation time margin 812 (e.g., to account for differences in range between nodes). By using margins of time, each received pulse 804 may more accurately be paired to the correct corresponding pulse 804 illustrated in the scanning sequence 802 of FIG. 8.

In some embodiments, example parameters may allow for a reliable spatial awareness up to a range of around 300 miles (e.g., 200 miles or more, 290 miles or more). For example, such parameters may include: a quantity of thirty-two pulses 804 horizontally scanned a full 360 degrees, a pulse width 808 of 100 microseconds (μsec), transmitter node and receiver node time uncertainty (error) margins 806, 810 of 1,000 μsec. Other determined (e.g., derived) parameters may include: a propagation delay of 1,610 μsec, a pulse repetition interval of 5,710 μsec., a pulse duty cycle of 1.75%, and a quantity of five scans (e.g., each scan being a scan cycle around 360 degrees) per second corresponding to a duration 814 of 0.20 seconds.

In some examples, the duration 814 may be less than one second, and/or greater than one second.

Figure 9A:
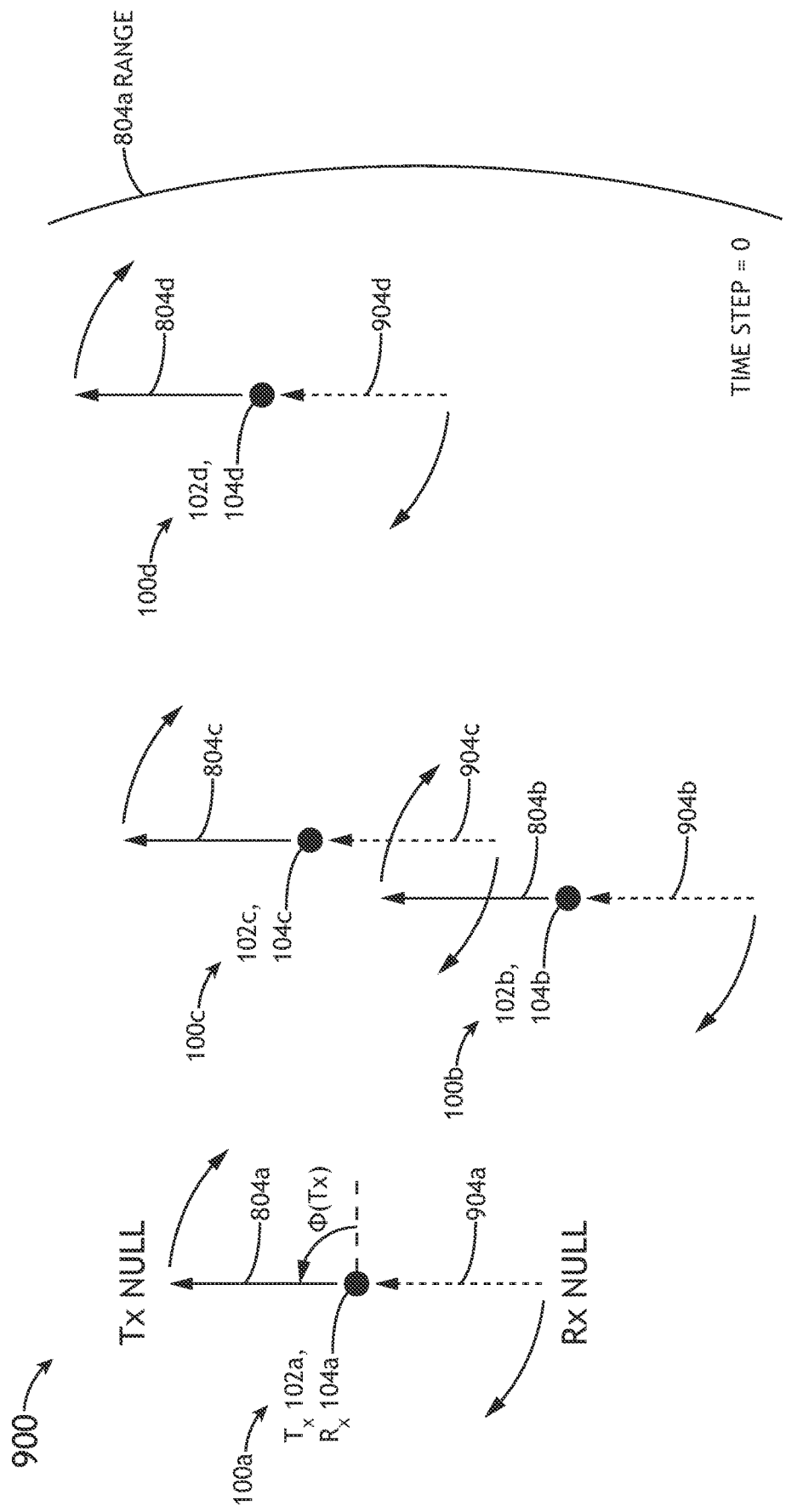
FIG. 9A is a diagrammatic illustration of multiple systems which are time synchronized to utilize a common scanning sequence such that the receiving angles and transmitting angles of each system will align, according to one or more embodiments of the present disclosure.

FIG. 9A is a diagrammatic illustration 900 of multiple systems 100 (e.g., 100a, 100b, 100c, 100d) according to one or more embodiments of the present disclosure. Each system 100 is configured to transmit and receive, such as via one or more directional antenna elements. In a sense, each system 100 may comprise a transmitter node and a receiver node (e.g., 102a,104a; 102b,104b; 102c,104c; 102d,104d), which could be the same node. If the systems 100 are time synced, then each system 100 is configured to receive a plurality of received pulses 804 from every other system along a receiving angle associated with each of the other systems 100 according to a scanning sequence 802, thereby increasing effective antenna gain. In theory, if each system 100 was time synced and desired to have spatial awareness of other time synced systems, then the system 100 could more efficiently improve antenna gain of receivable pulses by only searching for signals according to the scanning sequence 802, vastly reducing the angles/space to search for signals from. In this way, each system would only search for signals in a direction at the same time that nodes from that direction would be reciprocally transmitting—improving efficiency, range, and reducing noise produced by less efficient scanning techniques.

Figure 9B:
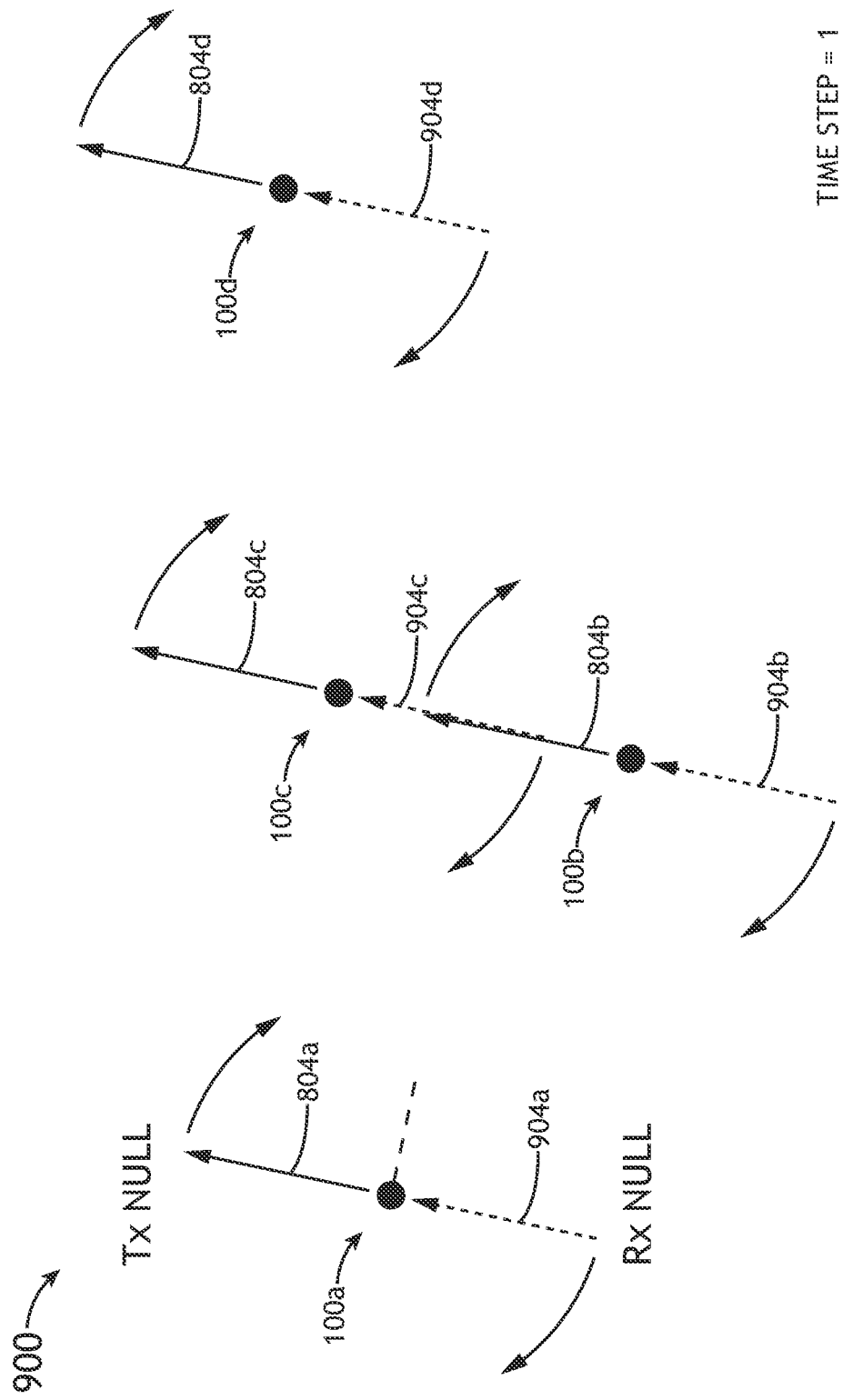
FIG. 9B is a diagrammatic illustration of FIG. 9A at a subsequent time step where a particular transmitting angle and receiving angle of different systems are aligned, according to one or more embodiments of the present disclosure.

FIG. 9B is a diagrammatic illustration 920 of FIG. 9A at a subsequent time step where a particular transmitting angle 804b and receiving angle 904c of different systems 100b, 100c are aligned or nearly aligned (e.g., within a detectable beam width).

In embodiments, each system 100 is time synchronized to utilize a common scanning sequence 802 such that the receiving angles 904a-904d (e.g., null Rx) and transmitting angles 804a-804d (e.g., null Tx angle $\phi$) of each system will align at particular steps in the scanning sequence 802. For example, as shown, the receiving angles 904a-904d of all systems 100 may be opposite relative to the transmitting angles 804a-804d during some or the entire execution of the scanning sequence 802. As described previously in regard to FIG. 10, this may allow twice the effective antenna gain due to alignment.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:
1. A system comprising:
   a receiver node comprising:
     a communications interface comprising a directional antenna element; and
     a controller operatively coupled to the communications interface, the controller including one or more processors, wherein the controller has information of own node velocity and own node orientation relative to a common reference frame;
   wherein the receiver node is time synchronized to apply Doppler corrections associated with the receiver node's own motions relative to the common reference frame,
   wherein the common reference frame is known to the receiver node prior to the receiver node receiving signals from a source.

2. The system of claim 1, wherein the system is configured to determine one or more net frequency shift points based on the signals.

3. The system of claim 2, wherein the determining of the one or more net frequency shift points is based on a scanning sequence known to the receiver node, wherein the signals correspond to at least a portion of a plurality of pulses of the scanning sequence.

4. The system of claim 3, wherein the receiver node is configured to determine a transmitting angle of a particular pulse based on a time-of-arrival of the particular pulse within the scanning sequence.

5. The system of claim 3, wherein a quantity of the plurality of pulses of the scanning sequence is at least 2.

6. The system of claim 3, wherein the plurality of pulses is configured to span a full 360 degrees in at least one of azimuth, or elevation.

7. The system of claim 3, wherein a duration of one cycle of the scanning sequence is less than a second.

8. The system of claim 2, wherein the system is configured to determine a bearing angle between the receiver node and the source, wherein the bearing angle is based on a zero-related value associated with the one or more net frequency shift points, wherein the zero-related value comprises at least one of:

a zero crossing of a function based on the one or more net frequency shift points; or a zero value and/or near zero value of the one or more net frequency shift points.

9. The system of claim 8, wherein the system is configured to narrow a beam width of a new signal transmitted by the system in the direction of the bearing angle between the receiver node and the source, and establish a two-way communication link with the source.

10. The system of claim 2, wherein the system is configured to determine a bearing angle between the receiver node and the source, wherein the bearing angle is based on a first bearing angle and a second bearing angle, wherein the first bearing angle is based on an angular distribution of antenna gain of the signals, and wherein the second bearing angle is based on the one or more net frequency shift points determined based on the signals.

11. The system of claim 2, wherein the one or more net frequency shift points are based on a difference between a common reference frequency known to the system and one or more measured frequencies of the signals.

* * * * *